United States Patent [19]
Watson, Jr. et al.

[11] Patent Number: 5,812,928
[45] Date of Patent: Sep. 22, 1998

[54] CABLE TELEVISION CONTROL APPARATUS AND METHOD WITH CHANNEL ACCESS CONTROLLER AT NODE OF NETWORK INCLUDING CHANNEL FILTERING SYSTEM

[75] Inventors: John C. Watson, Jr., Gray, Me.; Arthur W. Vemis, North Andover; Mark H. Olinsky, Haverhill, both of Mass.; William D. Sparks, Nashua, N.H.

[73] Assignee: Watson Technologies, Portland, Me.

[21] Appl. No.: 421,664

[22] Filed: Apr. 12, 1995

[51] Int. Cl.⁶ .............................. H04N 7/10; H04N 7/14
[52] U.S. Cl. ............................... 455/5.1; 348/7; 348/11; 348/12; 455/4.2; 455/6.1
[58] Field of Search ........................ 348/1, 2, 4, 5.5, 348/6, 7, 12, 13, 8, 10, 11; 455/2, 3.1, 4.1, 4.2, 5.1, 6.1, 6.2, 6.3; H04N 7/10, 7/14

[56] References Cited

U.S. PATENT DOCUMENTS

| | | | |
|---|---|---|---|
| 3,244,809 | 4/1966 | Fuller et al. ................................. | 178/6 |
| 3,651,471 | 3/1972 | Haselwood et al. .................. | 340/172.5 |
| 3,742,463 | 6/1973 | Haselwood et al. .................. | 340/172.5 |
| 3,975,583 | 8/1976 | Meadows ................................. | 178/5.6 |
| 4,064,460 | 12/1977 | Gargini .................................. | 325/308 |
| 4,074,310 | 2/1978 | Hurney et al. ........................... | 358/84 |
| 4,302,771 | 11/1981 | Gargini .................................. | 358/86 |
| 4,381,522 | 4/1983 | Lambert ................................. | 358/86 |
| 4,527,194 | 7/1985 | Sirazi ..................................... | 358/86 |
| 4,577,220 | 3/1986 | Laxton et al. ............................ | 358/84 |
| 4,580,161 | 4/1986 | Petrus et al. ............................. | 358/86 |
| 4,723,302 | 2/1988 | Fulmer et al. ............................. | 455/2 |
| 4,752,954 | 6/1988 | Masuko .................................... | 380/20 |
| 4,995,078 | 2/1991 | Monslow et al. ......................... | 380/10 |
| 5,031,213 | 7/1991 | Kawasaki ................................. | 380/10 |
| 5,129,100 | 7/1992 | Caporizzo et al. ...................... | 348/6 X |

(List continued on next page.)

FOREIGN PATENT DOCUMENTS

| | | | |
|---|---|---|---|
| 0 419 137 A2 | 9/1990 | European Pat. Off. | ....... H04N 7/173 |
| 55-44201 | 3/1980 | Japan | ............... H04N 5/00 |
| 63-166385 | 7/1988 | Japan | ............ H04N 7/167 |
| WO 92/10038 | 6/1992 | WIPO | ............. H04N 1/02 |
| WO 94/16527 | 7/1994 | WIPO | ............. H04N 7/16 |
| WO 94/19910 | 9/1994 | WIPO | ............ H04N 7/173 |

OTHER PUBLICATIONS

Santana, D. L., "Addressable set–tops: Signal security for today and the future," *Communications Technology*, (Nov. 1994), pp. 32, 34 and 35.

Palmer, Charles M., "An Off–Premises Converter With Multiple Signal Paths," *Technical Papers*, Cable '83, 32nd Annual Convention & Exposition, Houston, Texas, Jun. 12–15, 1983, pp. 212–215.

Dickinson, Robert V.C., "Jamming Techniques For Off–Premises Addressability," *Techincal Papers*, Cable '83, 32nd Annual Convention & Exposition, Houston, Texas, Jun. 12–15, 1983, pp. 216–219.

*Primary Examiner*—John K. Peng
*Assistant Examiner*—John W. Miller
*Attorney, Agent, or Firm*—Hamilton, Brook, Smith & Reynolds, P.C.

[57] ABSTRACT

A cable television control apparatus includes a television channel access controller connected at a node of a cable television network between the network and at least one subscriber household. All available cable television channels, including premium channels, can be transmitted by the headend without scrambling. Each access controller receives channel selection signals, such as television tuner local oscillator signals, from within subscriber households. The controller detects the channel selection signal and identifies selected channels. A channel filtering system is tuned in accordance with the detected selection signal to pass only selected channels to subscribers while blocking all other channels.

53 Claims, 13 Drawing Sheets

U.S. PATENT DOCUMENTS

| | | | |
|---|---|---|---|
| 5,172,413 | 12/1992 | Bradley et al. | 380/20 |
| 5,200,826 | 4/1993 | Seong | 358/191.1 |
| 5,206,722 | 4/1993 | Kwan | 358/86 |
| 5,216,499 | 6/1993 | Berkheimer | 358/86 |
| 5,245,420 | 9/1993 | Harney et al. | 358/86 |
| 5,278,988 | 1/1994 | Dejean et al. | 455/2 |
| 5,289,271 | 2/1994 | Watson | 348/1 |
| 5,334,975 | 8/1994 | Wachob et al. | 340/825.21 |
| 5,341,216 | 8/1994 | Hoffart | 348/1 |
| 5,345,504 | 9/1994 | West, Jr. | 380/7 |
| 5,359,601 | 10/1994 | Wasilewski et al. | 370/73 |
| 5,389,964 | 2/1995 | Oberle et al. | 348/9 |
| 5,404,161 | 4/1995 | Douglass et al. | 348/1 |
| 5,410,724 | 4/1995 | Worthy | 455/2 |
| 5,505,901 | 4/1996 | Harney et al. | 348/10 |
| 5,585,837 | 12/1996 | Nixon | 348/8 X |

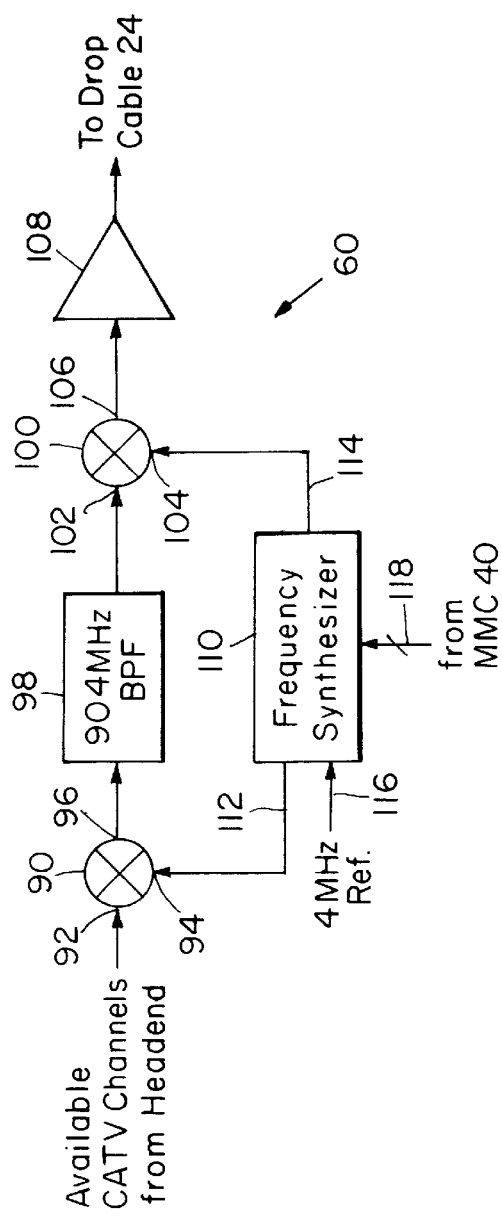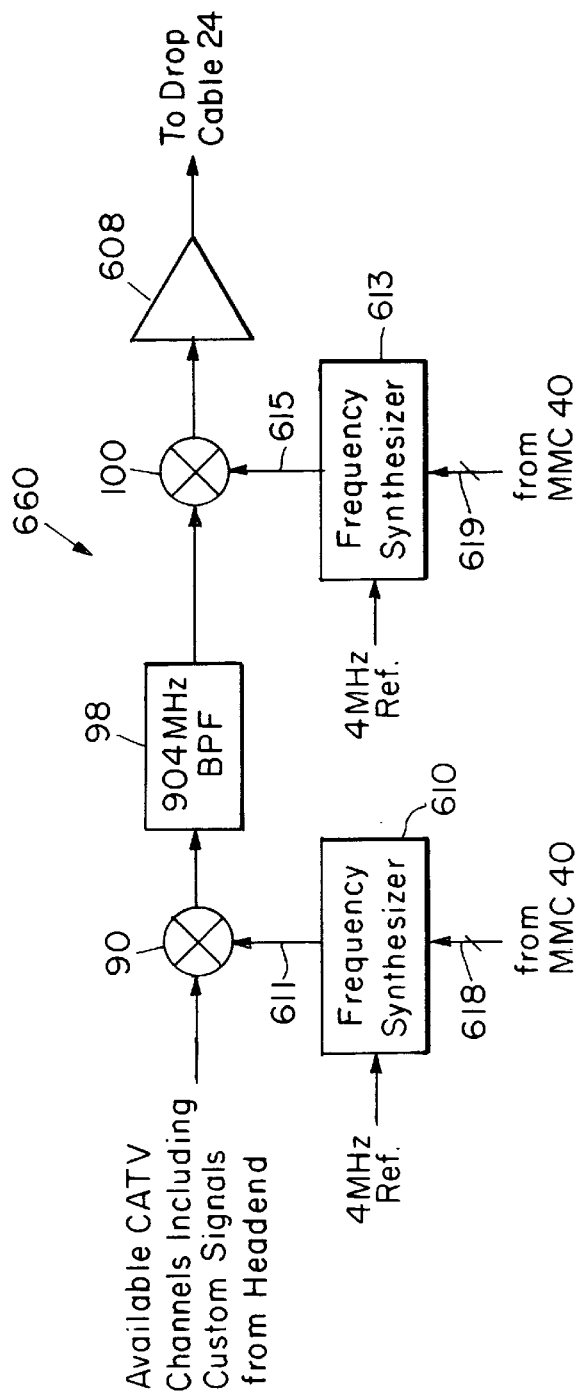

CABLE TELEVISION CONTROL APPARATUS AND METHOD WITH CHANNEL ACCESS CONTROLLER AT NODE OF NETWORK INCLUDING CHANNEL FILTERING SYSTEM

BACKGROUND OF THE INVENTION

A wide variety of cable television system configurations have been devised and implemented. The systems typically include a CATV origination center or headend which transports all of the television channels offered by the cable operator onto a network of coaxial and/or optical cables which are supported in the air above ground by utility poles ("on the strand") or are buried underground. Service to cable television subscribers is usually provided through multiple nodes on the cable network. Each node generally consists of a control box which forwards all of the available channels into one or more subscriber households. The node control box is either attached to a utility pole or, in an underground system, is supported in a pedestal above ground or in a wiring closet in multi-unit dwellings.

Most of the television channels transported from the headend are provided to subscribers who pay a uniform subscription rate. If the subscriber pays the fee, the node associated with his household is programmed to allow all of these "basic" channels to be forwarded into the subscriber's household. However, certain channels, commonly referred to as "premium" channels, are supplied on a per-subscriber basis. That is, if an individual subscriber wishes to receive a particular premium channel, he pays an additional subscription fee for that channel, and access to the channel is enabled for that subscriber. Several approaches to selectively controlling access to premium channels have been implemented.

The most common approach used by cable television systems is to scramble premium channels by altering their video signals such that they cannot be used to produce viewable pictures on a television receiver. This is commonly done by removing or distorting in some controlled fashion the horizontal synchronization signal from the channels' video signals. In such a system, each subscriber is provided with a programmable descrambler or decoder which can be programmed to return the video signal of selected premium channels to normal condition such that the subscriber can watch the selected channel. Thus, if the subscriber wishes to receive a particular premium channel, he contacts his cable operator to request the channel and pays the subscription fee for the channel, and the cable operator programs the subscriber's decoder to decode the selected premium channel.

Typical cable television systems handle up to 82 standard television channels and it is likely that the number of channels will increase up to and beyond 150. However, most television receivers in use cannot accommodate that large number of channels. To be compatible with television receivers, conventional cable television systems include a converter box installed within the subscriber's household to each television receiver. The converter box is tunable to select one of the channels coming into the household from the network node. In the converter box, the selected channel is up-converted to an intermediate frequency and then down-converted to the carrier signal of a single channel which all television receivers can receive, typically channel 3 or 4, depending upon the area in which the system is operating. With the converter box installed, the subscriber selects a channel by tuning his television receiver to channel 3 or channel 4 and then tuning the converter box to the desired channel. As a matter of convenience, the conversion and descrambling/decoding functions have typically been combined and implemented in a single box, commonly referred to as a converter/decoder unit, located within the subscriber's household.

In an attempt to eliminate the converter box from the subscriber's household, many manufacturers have begun selling "cable-ready" television receivers and video cassette recorders (VCRs) which can be tuned to receive all 82 channels. However, since the decoding function is implemented in the converter/decoder unit, the unit cannot be eliminated if the subscriber wishes to view premium channels. Hence, in these conventional cable television systems, even with a cable-ready television, the television receiver or VCR must be tuned to channel 3 or 4, and the converter box must still be used to select channels. This defeats many of the features available on televisions and VCRs, such as picture-in-picture, recording one channel while viewing another, etc.

Another type of system used to control access to premium channels is known as a "trap" system. In a trap system, each subscriber is provided with multiple traps or filters used to selectively block or enable particular channels. Positive traps are notch filters which remove jamming signals from particular selected premium channels such that the channels can be received by the subscriber. Negative traps are notch filters used to block selected channels. When a subscriber wishes to receive a particular premium channel, a positive trap is implemented at his location, either in a box within his household or in the control box at the node. When a subscriber wishes to prevent a particular channel from being received, a negative trap at that channel is implemented, again, either in the household or at the node.

Trap systems potentially require multiple positive and negative traps for each subscriber, and traps must be manually installed and removed. Another problem with trapping systems is that the bandwidth of notch filters is a function of the center frequency of the filter. The standard cable television channels presently in use have a standard bandwidth of 6 MHz, regardless of the center frequency of the channel. Since the bandwidth of a notch filter increases with its center frequency, a notch filter at a high frequency channel will have a wider bandwidth than a filter at a lower channel. The higher channel filter bandwidth may overlap channels and therefore filter out channels which should not be blocked.

Another type of system is known as an interdiction system. In an interdiction system, all channels, including premium channels, are transmitted from the headend in the clear. Each of the nodes injects a jamming signal onto all of the premium channel signals to make them impossible to receive. When a subscriber requests a particular premium channel, the node is programmed to remove the interfering signal from the requested channel. Interdiction systems are very hardware intensive since they require special hardware to generate and inject the interfering signal.

SUMMARY OF THE INVENTION

The present invention is directed to an apparatus and method for controlling access to television channels in a cable television system. The apparatus includes a controller at a node external to a subscriber household which identifies one or more channels to be forwarded to the subscriber. A tunable filter responsive to the controller accesses available cable television channels and passes only identified channels to the subscriber.

In one embodiment, the controller identifies channels to be forwarded to the subscriber in response to a channel selection signal from the subscriber household which identifies a channel selected by the subscriber. In this embodiment, the apparatus also includes a channel selection signal detector which is coupled to a subscriber channel indicator to detect a channel selection signal generated by the channel indicator. The channel selection signal is used to indicate a television channel selected by a subscriber. The tunable filter of the apparatus accesses all of the available television channels from the headend and also receives from the detector an indication of the detected channel selection signal. The tunable filter is dynamically tunable according to the channel selection signal such that it passes the selected television channel. The tunable filter is dynamically tunable in that its tuning can be changed to pass different channels as they are selected by the subscriber.

A preferred embodiment of the invention controls access to the 82 standard cable television channels commonly in use at the present time. However, as the number of channels increases, the present invention can be readily adapted to accommodate new channel requirements. While the description of the invention contained herein refers to the 82 commonly used channels, it will be understood that the invention is applicable to virtually any number of channels.

In one embodiment, the channel indicator is the local oscillator (LO) of the subscriber's television tuner, which can be a cable-ready television or a VCR tuner. In that embodiment, the channel selection signal is the LO signal generated by the tuner to select channels, and the channel selection signal detector detects the LO signal to identify selected channels. In another embodiment, the channel indicator is a device in the subscriber household which generates an encoded signal identifying a selected channel and forwards the signal to the channel selection signal detector. In that embodiment, the channel selection signal detector detects and decodes the signal to identify the selected channel. In either case, the tunable filter is tuned to pass only selected channels identified by the channel selection signal.

In a preferred embodiment, the invention is implemented in controller units at network nodes external to subscriber households. An input side of each controller is coupled to the cable network to receive all the available television channels from the headend. The output side of the controller is connected to one service drop cable for each subscriber serviced by the controller. Preferably, each controller services more than one subscriber and, in one embodiment, each controller services four subscribers. The subscriber end of each service drop cable is connected to one or more television receivers within each subscriber household.

The service drop cable serves a dual purpose. First, it carries the channel selection signal generated by the channel indicator out of the subscriber household back to the controller unit. The channel selection signal detector of the invention receives signals from the channel indicator on the service drop cable and searches for a channel selection signal within the received signals. Second, the drop cable carries selected television channels passed by the controller into the subscriber household to the television receivers.

The preferred tunable filter of the invention shifts all of the available channels up to a high frequency, such as in the UHF band, filters the shifted channels to pass only the selected channel, and shifts the selected channel back down to its normal frequency. To accomplish this, the tunable filter includes a pass filter comprising a tunable frequency synthesizer, a pair of mixers and a bandpass filter having a center frequency in a high frequency band, such as the UHF band, at a bandwidth which allows only a single standard channel to pass.

The signal indicative of the channel selected by the channel selection signal is used to program the tunable frequency synthesizer output to a frequency such that, when the synthesizer output is applied to one of the mixers with the available channels, the center frequency of the selected channel is shifted up to the center frequency of the bandpass filter. In one embodiment, the difference frequency components of the mixing process are applied to the bandpass filter. Therefore, the synthesizer output is set to a frequency which is the sum of the center frequency of the selected channel and the center frequency of the bandpass filter.

The shifted channels out of the mixer are applied to the bandpass filter, which passes only the selected channel on the modified high-frequency carrier. In one particular embodiment, the bandpass filter has a center frequency at about 904 MHz which allows the invention to control access to the 82 standard channels. As the number of channels handled by the invention increases, the center frequency of the bandpass filter may be changed to a higher frequency. The selected channel out of the bandpass filter is applied to an input of a second mixer. The signal from the tunable frequency synthesizer is applied to the second input of the second mixer. Once again, the difference frequency component is taken at the output of the mixer. The resulting signal is the selected television channel shifted back down in frequency to its standard frequency band. The selected channel is coupled from the tunable filter to the output of the controller. The signal propagates down the appropriate service drop cable to the television tuner which generated the channel selection signal.

Each pass filter passes only a single selected channel. To provide more than one selected channel to a subscriber household, the tunable filter of the invention preferably includes plural parallel pass filters, each of which passes only a single selected channel while blocking all other channels.

The preferred tunable filter of the present invention shifts the channels up in frequency to allow a single fixed-frequency precision bandpass filter to be used to tune the tunable filter to any available channel. Further, the large shift to a high filter frequency permits the use of only one frequency synthesizer, unlike conventional tuners. The 82 standard channels range in frequency from channel 2 having a center frequency at about 57 MHz to channel 78 having a center frequency at about 549 MHz. A frequency synthesizer tunable to all of these channels would have to be tunable over a range of more than three octaves. Typically, frequency synthesizers are incapable of such wide tuning ranges. In the preferred embodiment of the present invention, to allow the channels to pass through the 904 MHz bandpass filter, the frequency synthesizer must be tunable between about 961 MHz and 1.453 GHz, a range of less than one octave. Synthesizers with such tuning requirements are readily available. As the number of channels increases, so will the frequency range over which the synthesizer must be tunable. With a wider tuning range, it may become desirable to increase the 904 MHz center frequency to ensure that the synthesizer need not be tunable over a range greater than one octave.

It will be appreciated that the LO signal on the drop cable from the subscriber can be very difficult to detect since it is generally accompanied by other signals. The other signals include white noise and interference generated within the household by sources such as vacuum cleaners, etc. But, by far the most troublesome signals on the line are coherent interfering signals such as video signals from other channels being provided to the household. It can be a challenging task to separate the LO signal of the television tuner from those other signals.

In one embodiment of the invention, the signal from the television tuner is sampled to search for and detect the LO signal. In most cases, a clear channel search mode is used in which sampling of the signal is unconstrained in time. However, where the frequency of the LO being searched for is within the frequency band of a channel currently being passed to the subscriber, an interfering channel search mode is used in which the sampling is synchronized to signals on the line such that it is performed during comparatively quiet times of interfering signals of the interfering channel being passed to the subscriber. To that end, the receiver of the controller demodulates to baseband video the television channel whose frequency band includes the frequency of the LO signal for which the LO detector is searching. The sampling of the signal from the television tuner is synchronized to the baseband video signal of this second interfering channel such that it occurs during a quiet period of the video signal, thus reducing the interference which accompanies the signal from the television tuner.

In one embodiment, in the interfering channel search mode, samples of the signal from the television tuner are taken only during the vertical blanking period of the video signal of the second interfering television channel. It is during this period that the video is at its least active state and, therefore, introduces the least amount of interference into the system. This increases the likelihood that the LO detector will be able to locate the LO signal if it is present in the signals from the television tuner. In the clear channel search mode, i.e., when no channel is being passed to the subscriber which covers the LO being searched, then this synchronization of sampling is not performed.

The tunable filter of the present invention also reduces noise on the drop cable to the subscriber household. Since only selected channels are transmitted down the drop cable, noise including coherent interference on the line is substantially reduced. This improves the reliability, accuracy and speed of the channel selection signal detection process.

The LO detector also uses signal processing techniques to facilitate finding a LO signal. First, the digital signal processing techniques rely on the specifications of a LO signal, namely, that the signal has a frequency tolerance of ±200 kHz and therefore occurs within a 400 kHz window. The sampled signal data is band limited to 400 kHz, and a Discrete Fourier Transform is computed over the band. The DFT is preferably implemented by a Fast Fourier Transform at 1024 points. The use of the narrow band and the large number of frequency samples effectively increases the signal-to-noise ratio of the band and facilitates finding the LO signal in the band, if an LO signal is present.

The DSP reaches a conclusion as to the presence of a LO signal by performing a peak-to-average detection. The average of all of the FFT coefficients across the 400 kHz band is computed, and the ratio of the peak coefficient to the average value is computed. If the ratio exceeds a predetermined threshold, it is concluded that a LO signal is present.

The controller of the invention is also capable of communicating with the headend. A microprocessor in the controller can communicate with a processor at the headend over a modem communication link used for a multitude of communication functions. These include downloading controller software to controller memory and command and data communication between the headend and the controller. The link can be used by the controller to respond to headend commands and pass requested data to the headend.

The controller of the invention allows the interface between the cable operator and the subscriber to continue functioning as it has in prior systems, but with greatly improved subscriber flexibility. For example, the conventional method of providing service on a flat-rate monthly basis can be implemented. If the subscriber pays the appropriate fee, all of the channels can be selectively provided by the controller. Also, parental control can be implemented to identify channels which should always be blocked from the subscriber. However, since in one embodiment it is the television tuner which is selecting channels instead of a converter, the advanced features of modern television devices, i.e., picture-in-picture are enabled.

Another very important and powerful feature of the present invention is a memory capability which allows the controller to store channel usage information. As the controller provides channels to the various subscribers, the microprocessor and memory of the controller store information regarding the amount of time each subscriber views each channel. This information is stored in memory in the form of a viewing table. Periodically, for example once a month, the headend can command the controller to send the stored channel viewing data back to the headend. This capability allows the cable operator to bill the subscriber based upon actual channel viewing time, rather than on a flat-rate monthly basis. The channel viewing information can also be used by rating services to determine the popularity of particular television programs and by advertisers to determine the effectiveness of particular advertisements.

The controller of the invention can also be operated to provide a channel mapping feature in which any channel provided by the headend can be mapped to a channel being received by any number of subscribers, regardless of the channels requested by the subscribers. The cable operator can use this feature to forward custom signals to subscribers on a designated channel transmitted by the headend. Typically, this designated channel would be an unused channel. The custom signals or other standard channels are provided to the subscriber on the channel selected by the subscriber instead of the normal video signal for the selected channel such that the subscriber views the designated channel on the channel to which his television tuner is tuned.

This feature is useful where it is desired to broadcast a particular message, such as an Emergency Broadcasting System message, to all subscribers regardless of the channel to which their televisions are tuned. It can also be used to transmit a particular message to only selected subscribers grouped geographically, by identity, etc., such as where a particular emergency is localized to only a few subscribers ("narrow-cast"). An example of this type of situation is where a truck carrying dangerous chemicals has overturned in a neighborhood and it is desired to inform all subscribers in the neighborhood. Also, the custom signals can be used to inform a particular group of people, such as volunteer firefighters, of an emergency regardless of where they live. Another potential application for this feature is providing particular advertisements to particular subscribers based upon their personal characteristics and purchasing habits.

In one embodiment, the channel mapping feature is implemented by adding a second tunable frequency synthesizer to the tunable filter. At the headend, the carrier signal of the channel designated to be mapped to the selected group of subscribers is generated and transmitted with all of the other channels onto the network. The headend then commands via the modem link the controllers associated with the selected subscribers to tune their additional frequency synthesizers to a frequency which will cause the designated mapping channel to pass through the bandpass filter of the tunable filter. The other frequency synthesizer is tuned to a frequency which shifts the designated channel down to the frequency of the channel selected by the channel selection signal at the subscriber. Hence, even though the subscriber's channel indicator is tuned to the selected channel, the designated mapping channel is actually viewed.

The cable television access controller of the invention also facilitates a program rating function which is planned for implementation in cable television systems in the near future. In this "V-chip" rating system, each individual program is assigned a particular rating value based on its content. The rating value is either provided to subscriber nodes from the headend via the communication link or it is provided on each channel as part of the program's individual video signal. In either case, the controller of the invention can accommodate the rating function by identifying the rating value of each program being received from the headend and locking out particular programs based on subscribers' instructions.

The present invention has numerous advantages over prior cable television access control systems. Whereas in prior systems access to premium channels was determined by whether a particular subscriber had subscribed to a particular channel, in the present invention, all subscribers may be given access to all channels, unless a subscriber decides to block particular channels such as adult television channels. In general, if a subscriber tunes his television to a particular channel, he will receive that channel. He is simply billed at the end of the month based on the amount of time he was tuned to each channel. Consequently, all cable channels, including premium channels, can be transmitted by the headend in the clear. Since there is no need to scramble signals, expensive scrambling hardware at the headend and the descrambler at the subscriber end are eliminated. Also, in cable-ready televisions and VCRs, the benefits of a cable-ready tuner can be realized.

Another advantage of the invention is that the access control is located at a network node point instead of within a subscriber household as in previous systems. As a result, the system is noninvasive and transparent to the subscriber, with the exception of the single drop cable coming into the household. Controlled signal gating at the node point provides the system with much higher security against theft than prior systems. Only selected authorized channels are transmitted beyond the node point, in contrast to prior systems in which all channels including premium channels, even though scrambled, were passed beyond the node point. In such systems, theft of services is possible by implementing special boxes programmed to decode scrambled signals.

The system of the invention also provides subscribers with greater flexibility. The subscriber need only tune his television to a desired channel; he need not make a special phone call and wait for the service to be implemented, usually on a monthly basis.

Also, implementing pay-per-view programming is further simplified. Pay-per-view is treated the same as premium channels in that all the subscriber need do is tune his television to the appropriate pay-per-view channel. Once again, the process of buying pay-per-view time is simplified over that of prior systems in which the subscriber had to make a special phone call at a certain time in advance of the desired program to allow the cable operator adequate time to provide the service.

The system of the invention can also provide very sophisticated parental control of channel access. The software downloaded to a particular subscriber controller includes information regarding channels to which the subscriber does not wish to be provided access. The data is stored in the controller memory as a channel lockout table. The subscriber can specify certain times during the day when certain channels will be blocked as well as certain times during which certain channels will be allowed through. In prior systems, parental control required communication to the cable operator requesting that a particular channel be blocked or passed continuously until further instructions were received from the subscriber. In the present invention, cable view and lockout tables can be stored in memory to provide or deny access to specific channels at specific times as desired by the subscriber.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a block diagram of a channel selection filter system in accordance with the present invention.

FIG. 7 is a block diagram of an alternative embodiment of the channel selection filter system of the invention used to implement a channel mapping feature.

DETAILED DESCRIPTION OF THE INVENTION

Figure 1:
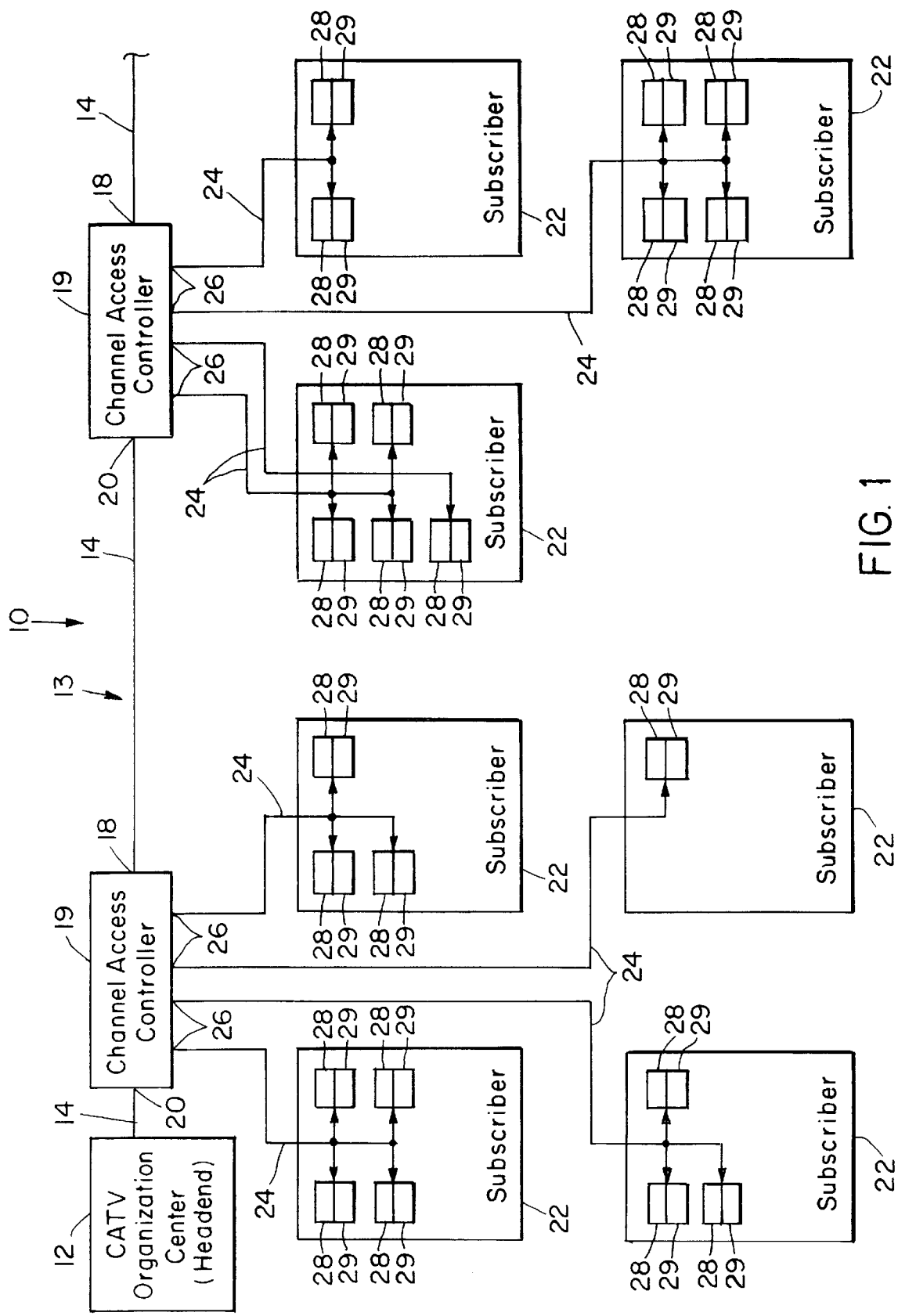
FIG. 1 is a block diagram of a cable television system in accordance with the present invention.

FIG. 1 is a block diagram of a cable television system 10 in accordance with the present invention. The system 10 includes a CATV origination center or headend 12 which transmits all of the available television channels provided by the cable operator over a cable network 13. The cable network 13 includes a trunk cable 14 connected to plural nodes 19 of the network 13. A channel access controller 18 in accordance with the invention can be coupled into the network at each node 19.

Each channel access controller 18 receives all of the available television channels at an input 20. Each controller 18 is connected to as many as four subscriber households 22 by drop cables 24. The drop cables 24 are connected between input/output ports 26 of the controller 18 and channel indicators 28 of television receivers 29 within subscriber households 22. The channel indicator circuit 28 of each television 29 can be the tuner of a cable-ready television receiver or VCR, or the tuner of a converter box connected to a non-cable-ready television, or it can be a signal generator which generates an encoded channel selection signal based on input from the subscriber. The drop cables 24 are used to transmit selected television channels from the controllers 18 to the television receivers 29 within the subscriber households 22. The cables 24 necessarily also carry any signals leaking or transmitted from the channel indicators 28 back to the access controllers 18.

It should be noted that each controller 18 is capable of servicing households 22 with any number of receivers 29 and corresponding channel indicators 28. In the preferred embodiment, each drop cable 24 services up to four receivers 29; therefore, if a household 22 has more than four receivers, it receives more than one drop cable 24, as shown. Such households can also be serviced with controllers 18 capable of servicing more receivers per drop cable.

Channel indicators 28 are used to select desired television channels for reception within subscriber households 22. When a subscriber wishes to view or record a particular television channel, he tunes the channel indicator 28 to the desired selected channel. In one embodiment, the channel indicator is a standard tuner of the television receiver. In that embodiment, the LO circuit within the tuner or tuning circuit 28 generates a LO signal used internally by the tuner 28 to select the incoming signal of the selected channel. Each television channel is assigned a unique LO signal frequency. In one embodiment, the access controller 18 of the invention senses the LO signal leaking out of the tuner 28 back upstream along drop cable 24 to the access controller 18. When the LO signal of a selected channel is detected by the access controller 18, the selected channel is forwarded as described in detail below to the appropriate input/output port 26 and through the drop cable 24 to the tuning circuit 28 which selected the channel.

In an alternative embodiment, the channel indicator 28 generates and transmits a modulated digital channel selection signal which is encoded with the identity of a selected channel to which the channel indicator 28 is tuned. The modulated digital signal travels along the drop cable 24 to the controller 18, where the channel selection signal detection circuitry demodulates the signal to identify the selected channel. The selected channel is separated or gated out of the available channels such that it is received by the subscriber.

Figure 2:
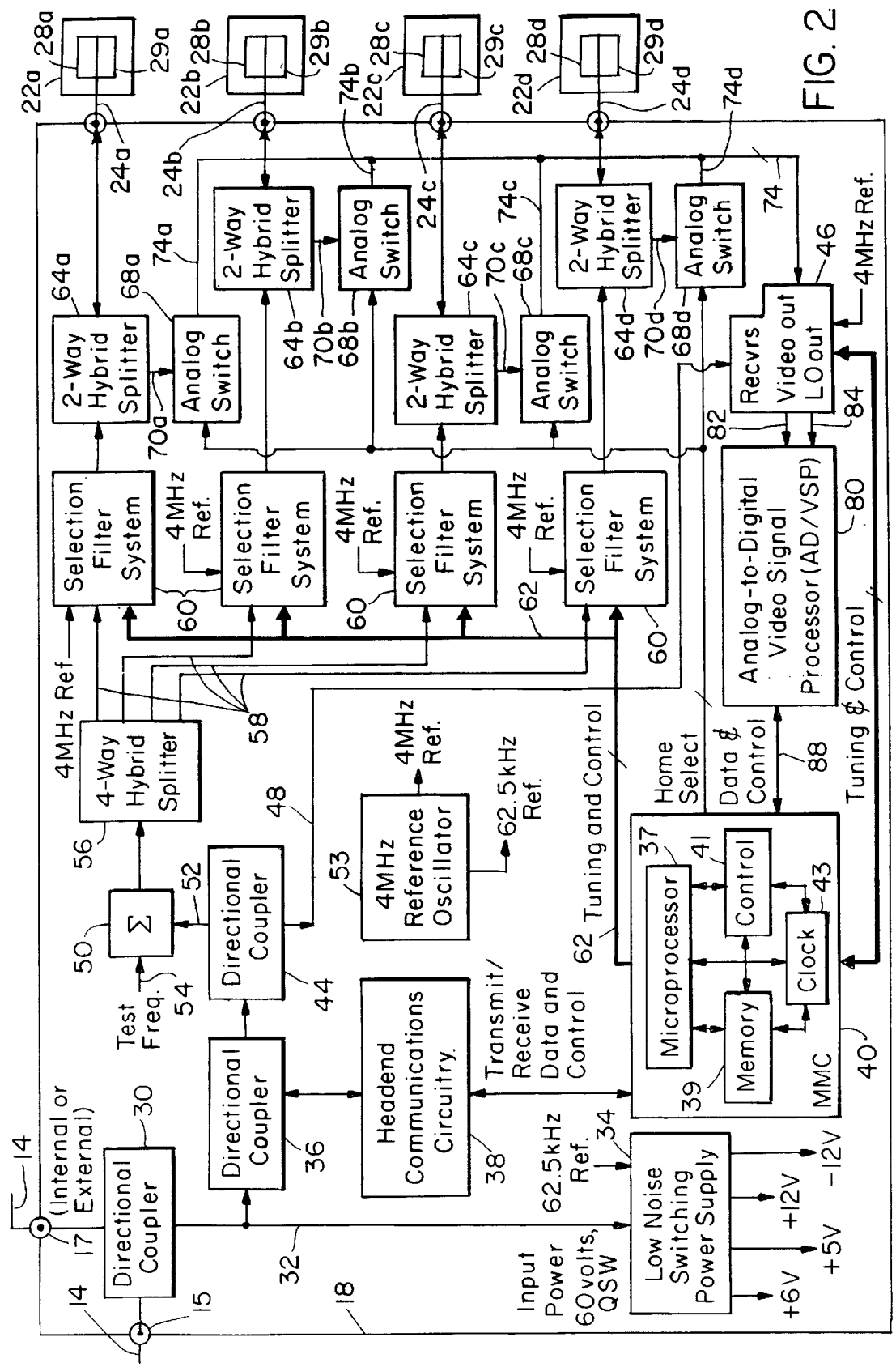
FIG. 2 is a block diagram of the television channel access controller of the present invention.

FIG. 2 is a block diagram of the television channel access controller 18 of the present invention. The cable network trunk cable 14 is coupled to the controller 18 at input connector 15. The circuitry of the controller 18 is coupled to the trunk line 14 via a directional coupler 30. The trunk line 14 passes out of the controller 18 at output connector 17.

The controller 18 uses as input power a 60-volt quasi square wave (QSW) signal provided by the cable network. The signal is coupled on line 32 to a low-noise switching power supply 34 which generates +6VDC, +5VDC, +12VDC and -12VDC outputs. These output DC voltages provide power for the remaining circuitry of the controller 18. The switching regulators within the power supply 34 are all synchronized to a reference frequency of 62.5 KHz. This is done to synchronize the ripple at the output of the power supply 34 with the same reference frequency used in all the synthesizers within the controller 18. This reduces the number of spurious signals within the system. The controller 18 also includes a 4 MHz reference oscillator 53 which generates a 4 MHz reference signal and the 62.5 kHz reference signal used by many system components.

The signal from the directional coupler 30 is also routed by a second directional coupler 36 to headend communication circuitry 38. The circuitry 38 includes drivers and receivers used to implement control and data modem communications between the headend and the controller 18. A modem function is implemented in which communications take place from the controller 18 to the headend 12 at a carrier frequency of 19 MHz, and from the headend to the controller 18 on a 118 MHz carrier. All communications required between the headend and the control box 18 take place via this modem communications facility. These communications include the downloading of controlling software from the headend, the issuing of commands by the headend 12 and the response thereto by the controller 18, periodic polling by the headend of accumulated viewing data and the transmission of the accumulated data to the headend 12 in response, etc.

It should be noted that the controller 18 of the invention serves as a slave to the headend 12. The controller 18 does not initiate communications with the headend 12. Rather, the headend 12 periodically polls the status of the controller 18, and the controller responds with status information, viewing data, or requests. Data communications with the headend 12 are controlled by microprocessor, memory and control circuitry (MMC) 40.

The MMC circuitry 40 controls all of the operations of the controller 18. It runs all of the controlling software of the system and is responsible for providing the control and timing required for all controller functions including timing the sampling of signals from individual subscriber households, tuning the receiver to detect channel selection signals, tuning the tunable filter to provide authorized selected channels, accumulating channel viewing data, communicating with the headend 12, performing system diagnostic testing, etc. The MMC circuitry 40 includes a microprocessor 37, memory 39, control circuitry 41 and a real-time clock 43. The memory 39 is used, among many other purposes, to store accumulated viewing data. The microprocessor 37 controls retrieving the stored data from memory 39, formatting the data for transmission and controlling the actual communication signal format and timing. Data and control communications between the communications circuitry 38 and the MMC 40 take place over transmit/receive data and control lines 42.

Directional coupler 36 also routes the available television channels to a third directional coupler 44 which routes the channels to RF receiver 46 on line 48 and also routes the channels to a summing node 50 on line 52. The summing node 50 is used to couple a test signal on line 54 into the system to test the system during diagnostics. Under normal operation, all of the available channels from the headend 12 enter a four-way hybrid splitter 56 which divides the signals into four separate signal paths, one for each subscriber. Each signal path 58 is routed to an individual tunable filter or tunable channel selection filter system 60. Each tunable filter system 60 is used to select up to four selected channels from among the available channels transmitted from the headend 12. It should be noted that four signal paths and four channel selection filters are used because the particular controller 18 shown services four subscriber households 22. It will be understood that different numbers of signal paths, selection filters 60 and subscriber households 22 are possible.

Each tunable selection filter 60 is tuned to pass up to four selected channels by tuning signals transmitted on tuning and control lines 62 from the MMC circuitry 40. As will be discussed below, the tuning signal sent to each filter system 60 is determined by a channel selection signal detected from a channel indicator 28 within an associated subscriber household 22. The selected channel from each selection filter system 60 passes through a two-way hybrid splitter 64 to input/output connector 26. The signal is then carried by drop cable 24 into the subscriber household 22 and into the television receiver 29.

As described above, in one embodiment, the controller 18 of the invention detects the LO signal leaking from a tuning circuit 28 to determine a channel selected by a subscriber. The LO signal leaks along drop cable 24 and into the controller 18 at input/output connector 26 and into the two-way hybrid splitter 64. The signal is applied to analog switch 68 via line 70. If the home select line 72 of the analog switch 68 is active, the signals pass through the switch 68 to line 74 which connects the signals to receiver 46.

Under control by the MMC 40, the receiver 46 serves a dual purpose. First, it receives the signals from the television tuning circuits 28 and searches them for particular channel selection signals one at a time. The receiver 46 converts the signals from the tuning circuits 28 down to video baseband frequencies such that a LO signal, if present, will occur at a frequency within the baseband video frequency range of 0–6 MHz. The baseband signals (LO) from the household 22 are forwarded to the analog-to-digital/video signal processor (AD/VSP) 80 on line 84. At the same time, the receiver 46 receives all available television channels from the headend via directional coupler 44. It filters out a single standard television channel which has a frequency range which includes the frequency of the LO frequency for which the receiver is presently searching. The receiver 46 demodulates the carrier of this second potentially interfering channel and forwards the baseband video signal of the second channel to the AD/VSP 80 on line 82. As mentioned above, the receiver 46 operates under the control of the MMC 40. Signals are transmitted back and forth between the MMC 40 and receiver 46 over tuning and control lines 86.

In one preferred embodiment, the AD/VSP 80 performs the signal processing required to determine whether a LO signal is present in the signals from the television tuning circuits 28. The AD/VSP 80 receives the baseband-converted signals from tuning circuits 28 on line 84 from the receiver 46. It samples, digitizes and stores the digitized signals in a first-in-first-out (FIFO) storage circuit. A digital signal processor (DSP) of the AD/VSP 80 reads the digitized signal data from the FIFO. A Discrete Fourier Transform implemented in the DSP analyzes the data in the frequency domain to locate a LO signal. If a signal is detected, an indication is forwarded to the MMC 40 over control and data lines 88. The frequency at which a LO signal is found identifies the selected channel and is used by the MMC 40 to tune the channel selection filter 60 associated with the subscriber which selected the channel to the channel selected by the identified LO signal such that the subscriber receives the selected channel.

As noted above, the AD/VSP 80 also receives the baseband video signal of a second channel having a frequency range which includes the frequency of the LO signal for which the AD/VSP 80 is presently searching. If such a channel is present, the interfering channel search mode is implemented in which the AD/VSP 80 synchronizes the sampling of the signal from the television tuning circuit 28 such that the sampling takes place during a quiet period of the video signal of the second channel. In the preferred embodiment, the signal from tuning circuit 28 is sampled during the vertical blanking period of the video signal of the potentially interfering second channel. This time is selected because it is during this time that the video signal of the second channel is in its most quiet condition. If no second channel is present, the clear channel search mode is implemented such that the sampling is not synchronized to a video signal, and, consequently, considerable data gathering time is saved.

As mentioned above, each controller 18 is capable of servicing several households 22; in the preferred embodiment, four households 22 are serviced. In addition, the controller 18 can service plural television receivers 29 within each household. Each selection filter system 60 actually includes up to four individual selection filters, each of which is individually tunable to pass a separate selected channel. Therefore, in the preferred embodiment, under a fully loaded condition, the access controller 18 must detect 16 different LO signals emitted by 16 different television tuning circuits 28.

In a preferred embodiment, the controller 18 of the invention accomplishes this by searching for the LO signal for one channel at a time, starting at channel 2 and continuing in frequency up through channel 78. At each channel, the controller 18 searches all households one at a time for a channel selection signal.

In a preferred embodiment, in the beginning of the searching cycle, the receiver 46 is first set to detect the LO signal of channel 2. To determine whether any of the television tuning circuits 28 in any of the households 22 is set to channel 2, a filter in receiver 46 is set to pass only the signals within the band of possible LO signal frequencies for channel 2. After the receiver is set to detect channel 2, signals from each tuning circuit 28 are allowed to pass through the receiver 46 one at a time. This is accomplished via the Home Select signal on line 72 from the MMC 40. The Home Select signal activates one analog switch 68 at a time to allow signals from one tuning circuit 28 at a time to reach the receiver 46. Since the receiver 46 is set to pass only channel 2 LO signals, the AD/VSP 80 will determine if any television tuning circuits 28 within any of the households 22 are tuned to channel 2.

To illustrate, Home Select signal 72a becomes active first to enable analog switch 68a to pass signals from household 22a to the receiver 46. After the signals are filtered by receiver 46, passed to AD/VSP 80 and digitized and stored, they are analyzed by AD/VSP 80 to determine if the channel 2 LO is present. If it is, then it is concluded that the subscriber in household 22a is requesting channel 2, and channel 2 is passed to household 22a. Next, Home Select signal 72a becomes inactive, and Home Select signal 72b becomes active. Signals from household 22b pass through analog switch 68b to the receiver 46. A determination is then made as to whether any television tuning circuits 28b within household 22b are set to channel 2. Next, Home Select signal 72c becomes active to detect channel 2 LO signals from household 22c. Finally, Home Select signal 72d becomes active to detect channel 2 LO signals from household 22d.

Next, the tuning of receiver 46 is changed such that it passes the band around the LO signal for channel 3. The Home Select signals 72a–72d are once again cycled to pass the signals from households 22a–22d, respectively, to the receiver 46 one at a time. This process of sampling signals from all of the households 22a–22d at each channel continues up through channel 78 and then begins again at channel 2 and is repeated continuously.

A discussion of standard cable television channel frequency assignments and characteristics for the 82 presently used channels will facilitate the remaining description of the present invention. Table 1 lists the 82 commonly used standard cable television channels. The second column of Table 1 contains the standard frequency range assigned to each CATV channel. Each channel spans a range of 6 MHz. Two other frequency assignment standards (not shown in Table 1) are also presently specified—the Harmonically Related Carriers (HRC) standard and the Interval Related Carriers (IRC) standard. The present invention is capable of controlling access to channels specified by any of the three standards.

The third column of the table lists the standard LO signal frequency used by standard tuning circuits to select the channels. For example, to select channel 2, a LO frequency of 101 MHz is used. For most channels, the assigned LO frequency falls within the band of another channel. The fifth column lists the channel on which each LO signal falls. Each channel includes a picture carrier signal whose frequency is generally 1.25 MHz above the extreme low frequency of the band. For example, for channel 2, the picture carrier frequency is 55.25 MHz. The fourth column of Table 1 gives the picture carrier frequency for each of the channels. Typically, the LO frequency of a channel is 45.75 MHz higher than the picture carrier frequency of the channel. With each channel being 6 MHz wide, then usually a LO signal falls about 7½ channels higher than the channel with which it is associated.

The sixth column of Table 1 gives the relationship in frequency between the LO signal and the picture carrier signal of the channel in which it falls. For example, the LO signal of channel 14 is at 167 MHz and falls within channel 21 at 3.75 MHz higher than the channel 21 picture carrier frequency (163.25 MHz). It will be noted from the sixth column that LO signals can fall in one of two positions relative to a picture carrier signal. The LO1 position is located 1.75 MHz above the picture carrier frequency. Only channels 5 and 6 have LO signals which have frequencies at the LO1 position. The vast majority of channels have LO signals whose frequencies are located at the LO2 position, which is 3.75 MHz above the picture carrier signal of the channel on which it falls.

Figure 3:
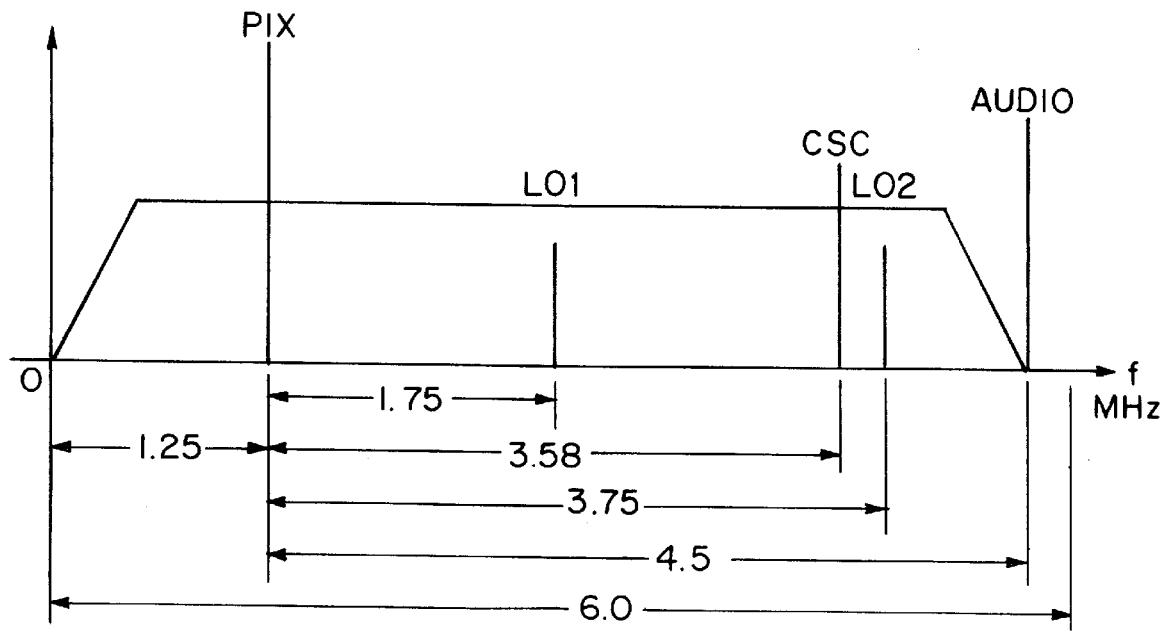
FIG. 3 is a schematic plot showing the relationships among the various signals which occur within the frequency band of a typical television channel.

FIG. 3 schematically illustrates the relationships in frequency among the various signals within a typical standard cable television channel. In FIG. 3, the picture carrier signal (PIX) is shown 1.25 MHz above the low end of the channel frequency range. The LO1 position is shown 1.75 MHz above PIX, and LO2 is shown 3.75 MHz above PIX. FIG. 3 also shows two other signals present in the channel range. The audio carrier signal is shown at 4.5 MHz above the picture carrier signal. Also, the color subcarrier burst signal (CSC) is shown at 3.58 MHz above the picture carrier.

TABLE 1

| | LO and FCC Channel Relationships | | | | |
|---|---|---|---|---|---|
| Cable Channel | Channel Frequency Range (MHz) | Picture Carrier Frequency (MHz) | LO (MHz) | Channel LO Falls On | Separation from Carrier, (MHz) |
| 2 | 54–60 | 55.25 | 101 | 96 | 3.75 |
| 3 | 60–66 | 61.25 | 107 | 97 | 3.75 |
| 4 | 66–72 | 67.25 | 113 | 98 | 3.75 |
| 5 | 76–82 | 77.25 | 123 | 14 | 1.75 |
| 6 | 82–88 | 83.25 | 129 | 15 | 1.75 |
| 95 | 90–96 | 91.25 | 137 | 16 | 3.75 |
| 96 | 96–102 | 97.25 | 143 | 17 | 3.75 |
| 97 | 102–108 | 103.25 | 149 | 18 | 3.75 |
| 98 | 108–114 | 109.25 | 155 | 19 | 3.75 |
| 99 | 114–120 | 115.25 | 161 | 20 | 3.75 |
| 14 | 120–126 | 121.25 | 167 | 21 | 3.75 |
| 15 | 126–132 | 127.25 | 173 | 22 | 3.75 |
| 16 | 132–138 | 133.25 | 179 | 7 | 3.75 |
| 17 | 138–144 | 139.25 | 185 | 8 | 3.75 |
| 18 | 144–150 | 145.25 | 191 | 9 | 3.75 |
| 19 | 150–156 | 151.25 | 197 | 10 | 3.75 |
| 20 | 156–162 | 157.25 | 203 | 11 | 3.75 |
| 21 | 162–168 | 163.25 | 209 | 12 | 3.75 |
| 22 | 168–174 | 169.25 | 215 | 13 | 3.75 |
| 7 | 174–180 | 175.25 | 221 | 23 | 3.75 |
| 8 | 180–186 | 181.25 | 227 | 24 | 3.75 |
| 9 | 186–192 | 187.25 | 233 | 25 | 3.75 |
| 10 | 192–198 | 193.25 | 239 | 26 | 3.75 |
| 11 | 198–204 | 199.25 | 245 | 27 | 3.75 |
| 12 | 204–210 | 205.25 | 251 | 28 | 3.75 |
| 13 | 210–216 | 211.25 | 257 | 29 | 3.75 |
| 23 | 216–222 | 217.25 | 263 | 30 | 3.75 |
| 24 | 222–228 | 223.25 | 269 | 31 | 3.75 |
| 25 | 228–234 | 229.25 | 275 | 32 | 3.75 |
| 26 | 234–240 | 235.25 | 281 | 33 | 3.75 |
| 27 | 240–246 | 241.25 | 287 | 34 | 3.75 |
| 28 | 246–252 | 247.25 | 293 | 35 | 3.75 |
| 29 | 252–258 | 253.25 | 299 | 36 | 3.75 |
| 30 | 258–264 | 259.25 | 305 | 37 | 3.75 |
| 31 | 264–270 | 265.25 | 311 | 38 | 3.75 |
| 32 | 270–276 | 271.25 | 317 | 39 | 3.75 |
| 33 | 276–282 | 277.25 | 323 | 40 | 3.75 |
| 34 | 282–288 | 283.25 | 329 | 41 | 3.75 |
| 35 | 288–294 | 289.25 | 335 | 42 | 3.75 |
| 36 | 294–300 | 295.25 | 341 | 43 | 3.75 |
| 37 | 300–306 | 301.25 | 347 | 44 | 3.75 |
| 38 | 306–312 | 307.25 | 353 | 45 | 3.75 |
| 39 | 312–318 | 313.25 | 359 | 46 | 3.75 |
| 40 | 318–324 | 319.25 | 365 | 47 | 3.75 |
| 41 | 324–330 | 325.25 | 371 | 48 | 3.75 |
| 42 | 330–336 | 331.25 | 377 | 49 | 3.75 |
| 43 | 336–342 | 337.2562 | 383 | 50 | 3.75 |
| 44 | 342–348 | 343.25 | 389 | 51 | 3.75 |
| 45 | 348–354 | 349.25 | 395 | 52 | 3.75 |
| 46 | 354–360 | 355.25 | 401 | 53 | 3.75 |
| 47 | 360–366 | 361.265 | 407 | 54 | 3.75 |
| 48 | 366–372 | 367.25 | 413 | 55 | 3.75 |
| 49 | 372–378 | 373.265 | 419 | 56 | 3.75 |
| 50 | 378–384 | 379.25 | 425 | 57 | 3.75 |
| 51 | 384–390 | 385.25 | 431 | 58 | 3.75 |
| 52 | 390–396 | 391.25 | 437 | 59 | 3.75 |
| 53 | 396–402 | 397.25 | 443 | 60 | 3.75 |
| 54 | 402–408 | 403.25 | 449 | 61 | 3.75 |
| 55 | 408–414 | 409.25 | 455 | 62 | 3.75 |
| 56 | 414–420 | 415.25 | 461 | 63 | 3.75 |
| 57 | 420–426 | 421.25 | 467 | 64 | 3.75 |
| 58 | 426–432 | 427.25 | 473 | 65 | 3.75 |
| 59 | 432–438 | 433.25 | 479 | 66 | 3.75 |
| 60 | 438–444 | 439.25 | 485 | 67 | 3.75 |
| 61 | 444–450 | 445.25 | 491 | 68 | 3.75 |
| 62 | 450–456 | 451.25 | 497 | 69 | 3.75 |
| 63 | 456–462 | 457.25 | 503 | 70 | 3.75 |
| 64 | 462–468 | 463.25 | 509 | 71 | 3.75 |
| 65 | 468–474 | 469.25 | 515 | 72 | 3.75 |
| 66 | 474–480 | 475.25 | 521 | 73 | 3.75 |
| 67 | 480–486 | 481.25 | 527 | 74 | 3.75 |
| 68 | 486–492 | 487.25 | 533 | 75 | 3.75 |
| 69 | 492–498 | 493.25 | 539 | 76 | 3.75 |
| 70 | 498–504 | 499.25 | 545 | 77 | 3.75 |
| 71 | 504–510 | 505.25 | 551 | 78 | 3.75 |
| 72 | 510–516 | 511.25 | 557 | NONE | NA |
| 73 | 516–522 | 517.25 | 563 | NONE | NA |
| 74 | 522–528 | 523.25 | 569 | NONE | NA |
| 75 | 528–534 | 529.25 | 575 | NONE | NA |
| 76 | 534–540 | 535.25 | 581 | NONE | NA |

TABLE 1-continued

LO and FCC Channel Relationships

| Cable Channel | Channel Frequency Range (MHz) | Picture Carrier Frequency (MHz) | LO (MHz) | Channel LO Falls On | Separation from Carrier, (MHz) |
|---|---|---|---|---|---|
| 77 | 540–546 | 541.25 | 587 | NONE | NA |
| 78 | 546–552 | 547.25 | 593 | NONE | NA |

As described above, a preferred embodiment of the channel access controller 18 of the invention provides access to selected channels by detecting the LO signal from subscribers' television tuning circuits 28. However, it is possible that the drop cable 24 carrying the LO will also be carrying standard television channels to the household at the same time it is carrying the LO signal leakage. The access controller 18 of the invention must therefore be able to isolate LO signals from not only noise, but also standard television signals being provided to the subscriber.

At baseband, LO signals at LO2 are at 3.75 MHz, while the color subcarrier burst (CSC) signal of the channel on which LO2 falls is at 3.58 MHz. If a television tuning circuit 28 is tuned to a particular LO2 while the channel on which that LO2 falls is being provided to the subscriber, two signals very close in frequency will be present simultaneously on the line. These two signals must be distinguished. In the interfering channel search mode, bringing the LO and video signals down to baseband and synchronously sampling the LO with the video signal of the overlapping channel facilitates making the distinction.

The various subsystems of the controller 18 of the invention will now be described in detail. FIG. 4 is a schematic block diagram of a channel selection filter system 60 used to pass a selected channel while blocking all other channels. The available CATV channels from the headend 12 are received by the selection filter 60 at one input 92 of a mixer 90. A signal output 112 from a tunable frequency synthesizer 110 is connected to a second input 94 of the mixer 90. The mixer 90 performs a heterodyne conversion, and the frequency difference components are provided at the output 96 of the mixer 90. The frequency synthesizer 110 is set to a high frequency (preferably a UHF frequency) to shift all of the CATV channels up in frequency (preferably into the UHF band). Thus, all of the channels are left intact shifted into the UHF band.

Figure 5:
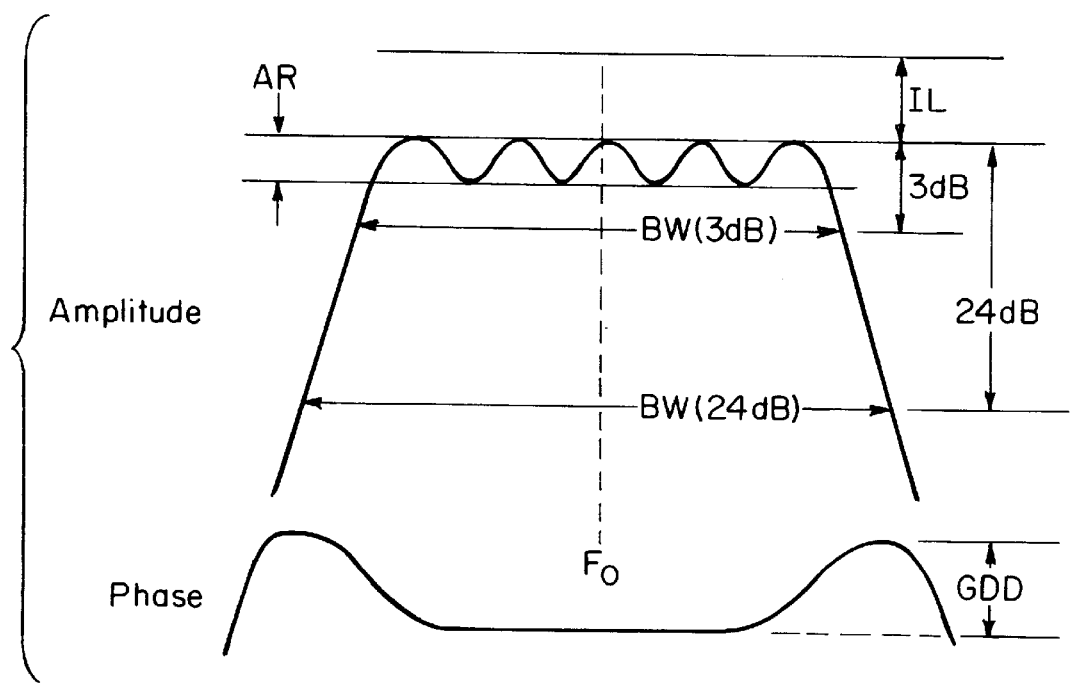
FIG. 5 is a plot of the amplitude and phase characteristics of the bandpass filter used in the channel selection filter system of the present invention.

The shifted channels are provided as an input to a bandpass filter 98. The bandpass filter 98 passes only a single television channel while blocking all the remaining channels. FIG. 5 contains two plots showing the amplitude and phase characteristics of the bandpass filter 98, and Table 2 lists preferred values for the characteristics. The center frequency $F_0$ is 904.0 MHz. The 3 dB bandwidth is 5.5 MHz. Thus, the filter 98 is only wide enough to pass a single standard television channel centered at 904 MHz. In fact, the pass band is slightly narrower than a standard television channel. However, the slight loss in audio signal is tolerable in order to ensure complete channel separation throughout the band. The 24 dB bandwidth of the filter 98 is less than or equal to 8.0 MHz. Thus, the filter requires extremely steep skirts, once again, to ensure adequate channel separation.

TABLE 2

| Center Frequency | $F_o$ | 904.0 MHz |
|---|---|---|
| Bandwidth (3 dB) | BW (3 dB) | 5.5 MHz |
| Bandwidth (24 dB) | BW (24 dB) | <8.0 MHz |
| Insertion Loss | IL | <10 dB |
| Amplitude Ripple | AR | <0.1 dB |
| Group Delay Distortion | GDD | <100 NS |
| In/Out Impedance | $Z_{in}/Z_{out}$ | 50 Ohms |
| Operating Temperature | Temp | −40° C. to + 70° C. |

Referring again to FIG. 4, the tunable frequency synthesizer output 112 is set to a frequency such that, when the output signal is mixed with the selected television channel, only the selected channel will pass through the bandpass filter 98. The synthesizer 110 is tuned according to the control signal 118 from the MMC 40, which is set in accordance with the detected channel selection signal from a subscriber household 22. For example, if it is determined that channel 2 is selected by detecting the channel 2 LO, then the control signal 118 will set the frequency synthesizer 110 to generate a signal at its output 112 having a frequency of 961 MHz. All of the channels will be shifted up in frequency an amount equal to the difference between 961 MHz and the frequencies within their own frequency bands. That is, channel 2, having a standard center frequency of 57 MHz, will be shifted to a center frequency of 961−57=904 MHz. Therefore, channel 2 will pass through the bandpass filter 98. On the other hand, channel 3, having a standard center frequency of 63 MHz, will be shifted to a center frequency of 961−63=898 MHz. Therefore, channel 3 will not pass through the bandpass filter 98. Likewise, no channel other than channel 2 will pass through the bandpass filter 98. The preferred implementation of the bandpass filter 98 is a ceramic filter, which can typically be manufactured far less expensively than SAW devices.

The selected channel at the shifted high-frequency carrier out of the bandpass filter 98 is applied to a first input 102 of a second mixer 100. Another signal 114 from the frequency synthesizer 110 is applied to the second input 104 of the mixer 100. The signal 114 out of the frequency synthesizer 110 is at the same frequency as the signal 112. The difference component of the mixing products appears at output 106 of the mixer 100. Hence, the selected channel is shifted back down to the standard carrier frequency. Using channel 2 as an example again, the second mixer 100 shifts the channel down to a center frequency of 961−904=57 MHz, its standard center frequency. The selected channel is then amplified by amplifier 108 and then forwarded to a subscriber household 22 via the drop cable 24.

Because of the shift in frequency to the high frequency band, the single frequency synthesizer 110 is tunable over the entire range of frequencies required to handle the 82 television channels. At the standard channel center frequencies between 57 MHz and 549 MHz, a synthesizer having the capability of spanning several octaves would be required. Conventional frequency synthesizers cannot be tuned over such a wide frequency range. However, with the frequency shift to the UHF band, the required range begins at 961 MHz for channel 2 and extends up to approximately 1,453 MHz for channel 78. In the higher UHF band, the entire tuning range is less than a full octave. A synthesizer capable of tuning across such a range is readily available.

The frequency synthesizer 110 receives a 4 MHz reference signal from the reference crystal oscillator circuit 53 shown in FIG. 2. The synthesizer 110 divides the 4 MHz reference signal down to a 62.5 kHz reference which it uses to generate all of the signal output frequencies. Each output frequency is an integer multiple of the 62.5 kHz reference signal. That is, $F_{out}=N \times F_{Ref}$, where $F_{out}$ is the output frequency, N is the integer multiplier, and $F_{Ref}$ is the 62.5 kHz reference frequency. N ranges from a value of 15,376 used to generate the 961 MHz signal for channel 2 up through 23,248 used to generate a signal at 1,453 MHz for channel 78.

The relatively high 62.5 kHz reference signal of the frequency synthesizer 110 allows for a relatively small multiplier N, resulting in faster frequency setting and settling, and provides the frequency setting control loop with a wide loop bandwidth of approximately 2.5 kHz. In the present configuration, the settling time of the frequency setting loop is approximately 1 msec. That is, the system requires up to only 1 msec to stabilize at a new frequency after receiving a command to change to a new frequency.

As mentioned above, each selection filter system 60 is capable of servicing several receivers 29 within each household 22 that it services. In the preferred embodiment, each selection filter system 60 services up to four receivers 29 in each household. Therefore, each selection filter system 60 includes four filters. Where more receivers 29 are present in a particular household 22, additional channel selection filter systems 60 are assigned to service the household 22 as required.

Figure 6:
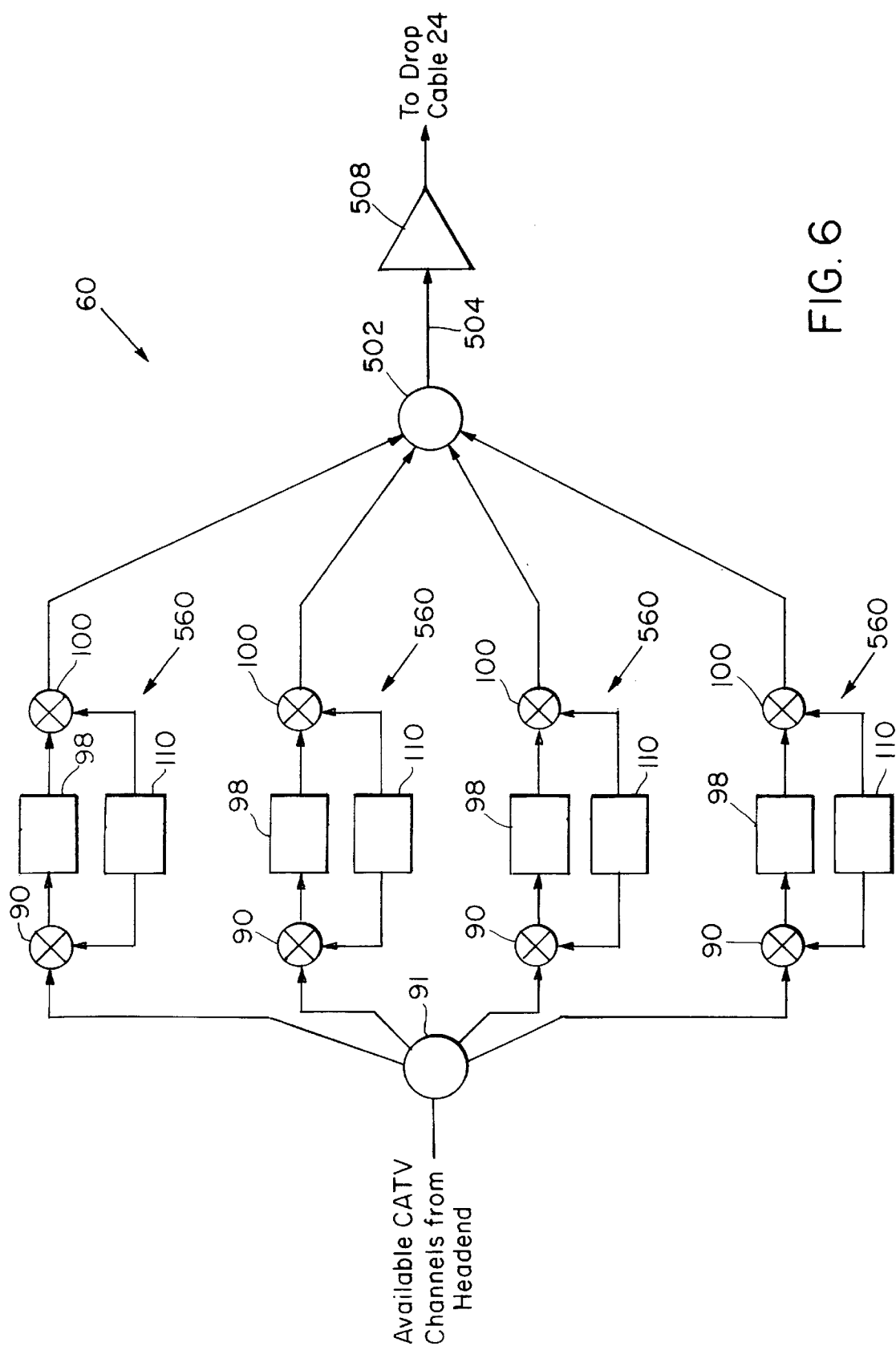
FIG. 6 is a block diagram of a typical channel selection filter system in accordance with the present invention capable of servicing up to four television tuners in a single household.

FIG. 6 is a block diagram of the filter system 60 capable of servicing four receivers 29 in a single household. In the multiple-tuner channel selection filter 60 shown in FIG. 6, each filtering stage 560 is responsible for providing a single channel to a subscriber as described above in connection with FIG. 4. All of the available CATV television channels are received from the headend at a four-way splitter 91. The splitter 91 splits the signals such that each stage 560 receives all of the available cable television channels from the headend and filters out a single channel selected by the channel selection signal detected from its associated channel indicator 28 within the subscriber household 22. Each stage includes a 904 MHz bandpass filter 98 and a tunable frequency synthesizer 110. A first mixer 90 of each stage shifts the available television channels up in frequency to the UHF band, and a second mixer 100 shifts the selected channel back down to its standard frequency band. The selected channels are provided to a coupling node 502 where they are combined onto a single output line 504. An amplifier 508 amplifies the signals and forwards them to the appropriate drop cable 24.

In an alternative embodiment, each channel selection filter system includes two individually tunable frequency synthesizers to allow for implementation of a channel mapping feature of the invention. This feature allows the cable operator to transmit a designated mapping channel to subscribers regardless of the channels to which the subscribers' television channel indicators 28 are tuned. Any standard designated channel can be mapped to subscribers' television receivers 29 and will be received and viewed by each subscriber on the channel selected by his channel indicator. This feature allows the cable operator the flexibility to transmit specific custom signals to all or certain designated groups of subscribers on an unused standard channel.

FIG. 7 is a block diagram of the alternative embodiment of the channel selection filter system 660 which allows implementation of the channel mapping feature. The channel selection filter system 660 receives all available cable television channels from the headend. These include a particular designated channel which is to be forwarded to the subscriber drop cable 24, regardless of the channel selected by the subscriber. This channel may be any standard television channel or it may be a channel which has been modulated with specific custom signals such as custom advertisements. It may also be a channel designated to carry Emergency Broadcasting System messages to all subscribers or selected subscribers.

The first frequency synthesizer 610 is tuned by the MMC 40 on lines 618 to a frequency such that its output signal 611, when mixed with the available television channels in mixer 90, shifts the designated channel to a center frequency of 904 MHz. The signal 618 is set by some external source via the MMC 40. The external source can be the headend using the modem facility to inform the controller 18 of the designated channel frequency.

The designated channel is passed by the bandpass filter 98 to the second mixer 100. Frequency synthesizer 613 is set by the MMC 40 via lines 619 according to a channel selection signal, such as an LO signal, from the subscriber's television channel indicator 28. The frequency of the output signal 615 is set such that when the output signal on line 615 is mixed with the designated channel in mixer 100, the designated channel is output from the mixer 100 at the frequency of the channel selected by the subscriber's tuning circuit 28. Thus, the subscriber views the channel designated by the headend on his television receiver, regardless of the channel to which his channel indicator 28 is tuned.

An example will illustrate the operation of the channel mapping feature. Assuming that the cable operator wishes to transmit a signal on channel 14 to one or more subscribers, the custom signals modulate the channel in the band between 120 and 126 MHz with a center frequency of 123 MHz. The headend commands the controller 18 via the modem communication facility to set the first frequency synthesizer 610 to a frequency of 904+123=1,027 MHz. The center frequency of channel 14 is shifted by mixer 90 to a center frequency of 904 MHz such that it passes through the bandpass filter 98. Assuming for the example that a particular subscriber's channel indicator circuit 28 has been detected as being tuned to channel 4, the MMC 40 commands the second frequency synthesizer 613 to an output frequency of 904+69=973 MHz. The mixer 100 shifts the designated channel (channel 14) down to the frequency band of channel 4 centered at 69 MHz. The signal is amplified by amplifier 608 and forwarded to the subscriber on drop cable 24. Since the subscriber's television is tuned to channel 4, the custom signals are received and viewed on the subscriber's television receiver.

Figure 8:
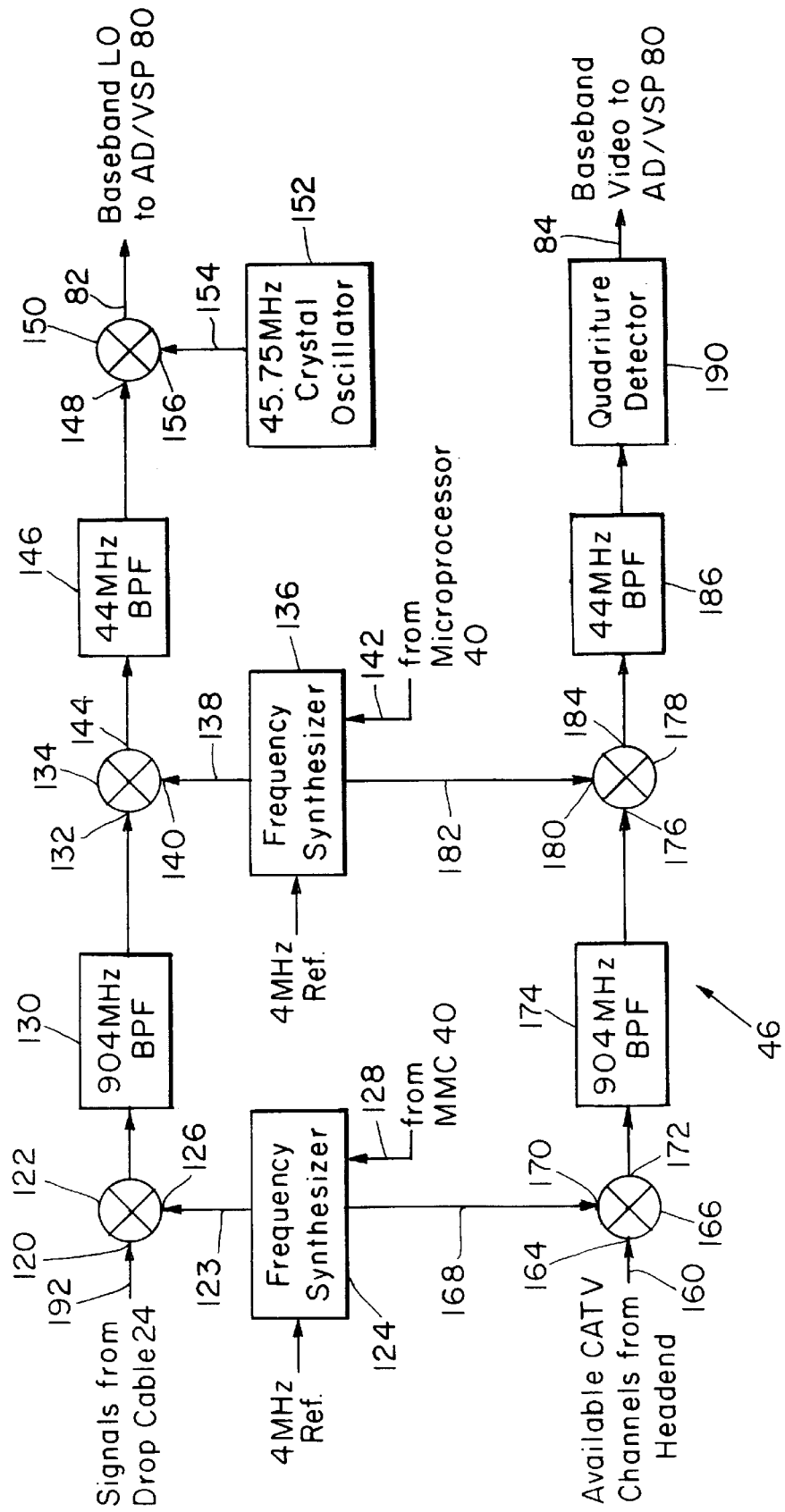
FIG. 8 is a block diagram of the receiver of the present invention.

FIG. 8 is a block diagram of the receiver 46 in the access controller 18 of the invention. As described above, in the preferred embodiment, locating the LO signal is facilitated by locating, identifying and isolating the video signals of the television channel on which the LO signal falls if the television channel is being provided to the subscriber. To that end, the receiver 46 receives the available CATV television channels from the headend 12 at an input 160, demodulates the channel on which the LO signal being searched for falls, and outputs the video signals of the potentially interfering channel at baseband at output 84. In the interfering channel search mode, the video signal is used by the AD/VSP 80 to synchronize sampling of the baseband LO data received from the receiver 46 on output 82. By sampling the baseband LO signal during quiet periods of baseband video signal, locating a LO signal is facilitated.

The available cable television channels are provided at a first input 164 of a mixer 166. The frequency synthesizer 124 provides an output signal 168 as the second input 170 of the mixer 166. The output 168 is set to a frequency which shifts the input signals at the mixer 166 such that only the channel on which the LO being searched for falls is allowed to pass through the 904 MHz bandpass filter 174. The mixer 166 shifts all of the available channels up to the UHF band in the same fashion as the channel selection filter system 60 described above in connection with FIG. 4. The 904 bandpass filter 174 is the same type as the filter 98 described in connection with FIG. 4. All of the shifted channels are applied to the input of the 904 MHz bandpass filter 174 which passes only the television channel on which the LO signal being searched for falls.

For example, if channel 2 is being searched for, the receiver 46 is set to detect a LO signal at 101 MHz. Channel 96 spans the range from 96 to 102 MHz, which includes the channel 2 LO frequency. The frequency synthesizer 124 is therefore set to pass channel 96. The frequency of the output signal 123 is set to 1003 MHz such that channel 96 is shifted from its normal center frequency of 99 Mhz to a center frequency of 904 MHz such that it passes through the bandpass filter 174.

The channel passed by the bandpass filter 174 is applied to a first input 176 of another mixer 178. The second input 180 of the mixer 178 is provided by an output 182 of frequency synthesizer 136, which is set to a frequency of 860 MHz by MMC 40. The channel is therefore shifted down to a center frequency of 904−860=44 MHz and appears at the output 184 of the mixer 178. A 44 MHz bandpass filter 186 filters the signal and applies it to a quadrature detector 190 which demodulates the channel down to baseband video. The baseband video of the demodulated channel is provided to the AD/VSP 80 via line 84.

The receiver 46 also receives signals from a subscriber drop cable 24 at an input 192 and demodulates the signals to provide them at baseband to AD/VSP 80 on line 82 such that a LO signal, if present, can be detected from the subscriber. Signals coupled from a drop cable 24 are provided at a first input 120 of a mixer 122. An output 123 of the programmable frequency synthesizer 124 provides the second input 126 to the mixer 122. The frequency of the signal at the synthesizer output 123 is set by the control signal on line 128 from the MMC 40 to the same frequency as line 168 such that a band of frequencies replicating a standard television channel with the LO signal at position LO1 or LO2 is passed through the 904 MHz bandpass filter 130. In the preferred embodiment, the 904 MHz bandpass filter 130 is the same type as the 904 MHz bandpass filter 98 used in the channel selection filter system 60 shown in FIG. 4.

The filtered signal out of the 904 MHz bandpass filter 130 is then provided to a first input 132 of a second mixer 134. A second frequency synthesizer 136 provides at output 138 the second input 140 to the mixer 134. The frequency of the output signal 138 of the frequency synthesizer 136 is set by MMC 40 via input line 142 to a frequency of 860 MHz, resulting in a band of signal frequencies at output 144 of the mixer 134 centered at the difference frequency of 904−860= 44 MHz. The signal is then applied to a 44 MHz bandpass filter 146.

The output of the bandpass filter 146 is provided to a first input 148 of a third mixer 150. A crystal controlled oscillator 152 provides at output 154 the second input 156 to mixer 150. The frequency of the output signal 154 of the crystal controlled oscillator 152 is 45.75 MHz. The mixer 150 demodulates the signal from the drop cable 24 such that any signals remaining are at baseband. Thus, any LO signals at position LO1 (channels 5 or 6) will be present at 1.75 MHz, and any LO signals at position LO2 will be at 3.75 MHz. The baseband signal is forwarded to the AD/VSP 80 on line 82.

Figure 9:
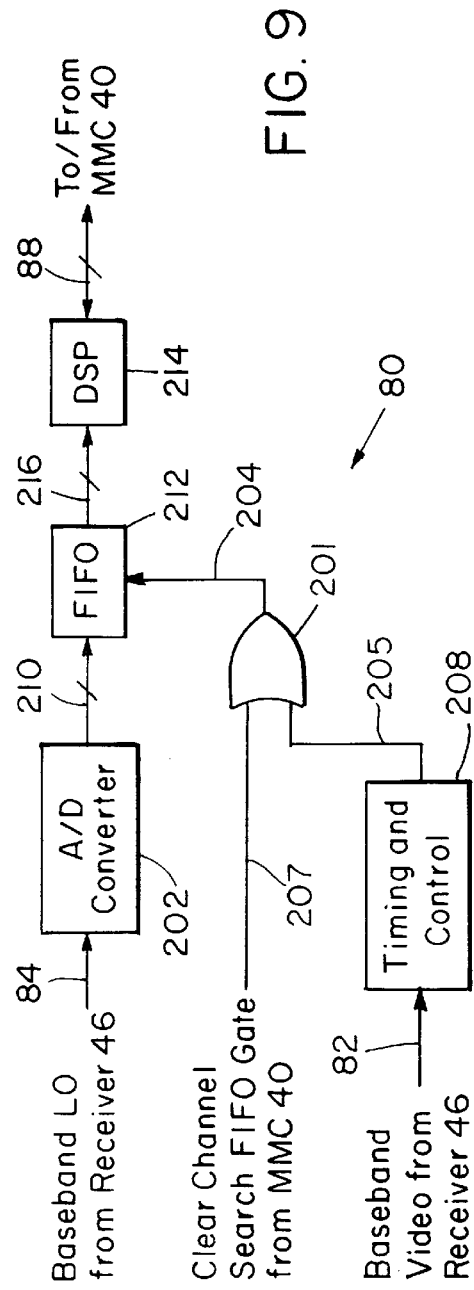
FIG. 9 is a top-level block diagram of the analog-to-digital video signal processor of the invention.

FIG. 9 is a top-level functional block diagram of a portion of the analog-to-digital video signal processor (AD/VSP) 80 in the access controller 18 of the invention. The AD/VSP 80 receives on line 84 the baseband signals from receiver 46 which are presently being searched for a LO signal (referred to herein as "baseband LO"). The signals are received by an analog-to-digital converter (ADC) 202, which samples the input signals and forwards digital sample data to a first-in-first-out (FIFO) storage device 212 on lines 210. Storage of data in the FIFO is controlled by a gate signal 204. When the gate signal 204 is active, data from the ADC 202 is loaded into the FIFO 212.

The FIFO gate signal 204 is activated via the OR function 201 by either the Clear Channel Search FIFO Gate signal 207 or the Interfering Channel Search FIFO Gate signal 205. When no interfering channel covering the LO signal being searched for is presently being provided to the subscriber, signal 207 is active to gate the loading of the FIFO 212. When an interfering channel is present, the interfering channel search mode is implemented in which the gate signal 204 is used to synchronize storage of data samples from the baseband LO with the baseband video signal from the receiver 46. Timing and control circuitry 208 receives the baseband video signal from the receiver 46 on line 82 and generates the gate signal 205. In a preferred embodiment, the timing and control circuitry 208 activates the gate signal 205 during the vertical blanking period of the baseband video.

After the FIFO 212 is loaded with data for a single household, the FIFO 212 interrupts the digital signal processor (DSP) 214. The DSP 214 reads the stored data from the FIFO 212 on lines 216. The DSP 214 filters the data and performs a Discrete Fourier Transform, implemented by a Fast Fourier Transform, on the data to identify peak frequencies within the 400 kHz band. The DSP 214 then performs a peak-to-average ratio detection on the frequency coefficients to determine if a LO signal is present in the data. If a LO signal is located, an indication is sent to the MMC 40 to allow the MMC 40 to tune the appropriate channel selection filter system 60 such that the channel selected by the located LO signal can be provided to the appropriate subscriber household.

The MMC 40 also accumulates data used by the DSP 214. These data include the present average and peak values of Fourier coefficients for the data band associated with each channel and tuning circuit 28. The DSP 214 can use these data to update thresholds and characterize ambient noise characteristics for each of the data bands. It can also use the data to determine when characteristics of a given band have suddenly changed, such as when a subscriber changes a channel or turns off his television tuner.

Figure 10:
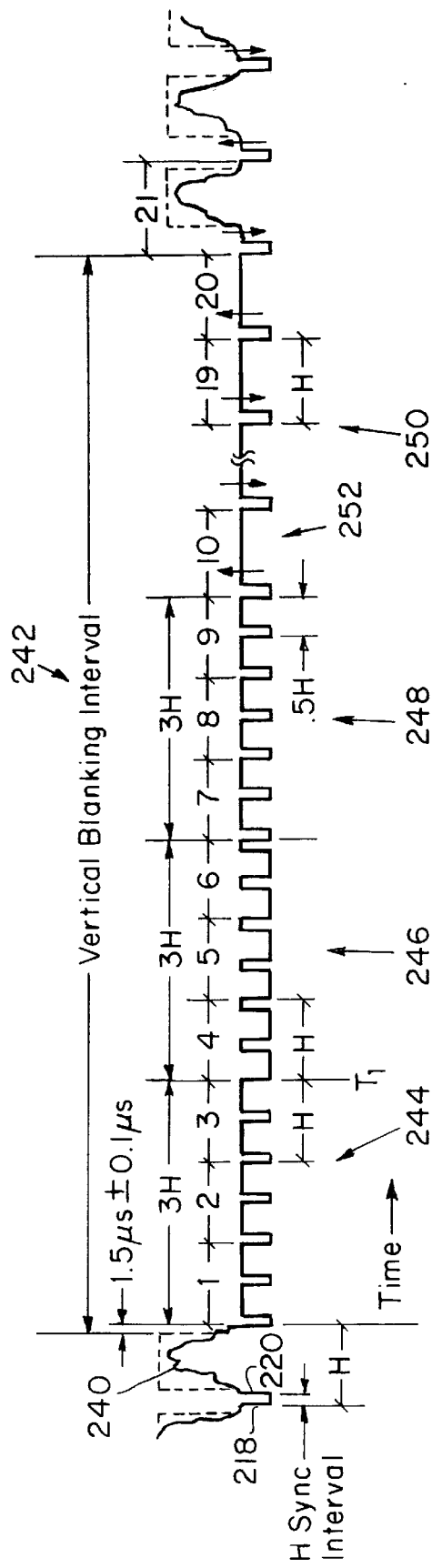
FIG. 10 is a schematic timing diagram of a typical standard baseband video signal.
Figure 11:
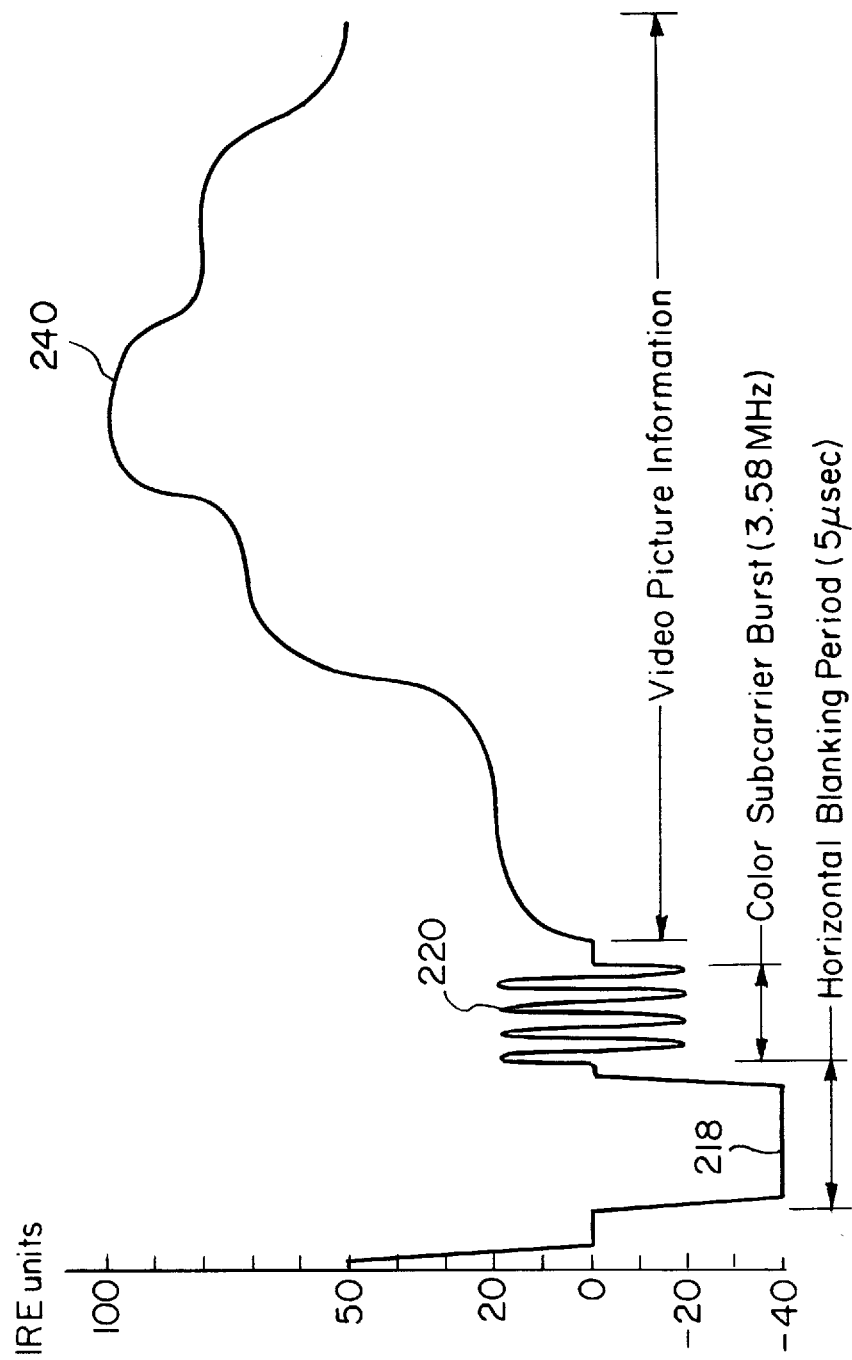
FIG. 11 is an expanded plot of a portion of a typical standard baseband video signal.

Before describing the detailed operation of the AD/VSP 80, a standard television video signal will be described. FIG. 10 schematically illustrates a standard television video signal in accordance with the National Television Standards Committee (NTSC). The video signal includes a series of horizontal blanking periods or horizontal synchronization (H SYNC) intervals 218. Each H SYNC interval is typically 5 µsecs wide and occurs periodically at 15.75 kHz. The period between H SYNC intervals or pulses is therefore 63.49 µsecs and is indicated by H in FIG. 10. Each H period represents a single line across the display of a standard television. FIG. 11 is an expanded view of the NTSC standard video signal. Referring to FIGS. 10 and 11, the horizontal sync interval or blanking period 218 is typically followed by 9 cycles of a color subcarrier burst signal (CSC) 220 at 3.58 MHz. The color burst is followed by video picture information 240 for the remainder of the period before the next H SYNC pulse.

Referring to FIG. 10, the video signal also includes periodic vertical blanking intervals 242 which occur at a frequency of 60 Hz. Each vertical blanking interval is 20 H periods wide with a tolerance of +H, −0. That is, each interval is 1,271 μsecs +63.5 μsecs, −0 μsec wide. During the vertical blanking interval 242, horizontal sync serration pulses continue to be generated but at varying rates and durations. Each vertical blanking interval 242 is effectively divided into 4 separate subintervals 244, 246, 248 and 250 by this variation in H SYNC serration pulses.

As described above, during the normal video signal, H SYNC pulses are 5 μsecs in duration and occur at 63.49 μsec intervals. During the first subinterval 244 of the vertical blanking interval 242, the H SYNC pulses are received at twice their normal frequency, i.e., 31.5 kHz, and their duration is half the normal duration, i.e., 2.5 μsecs. This subinterval continues for 3 horizontal lines of data until the second subinterval 246 begins. The second subinterval 246 also consists of 3 lines of pulses. The pulse structure is essentially the inverse of the subinterval 244, except that the pulse duration is extended back to the normal 5 μsecs. The third subinterval 248 is identical to the first subinterval 244.

The last subinterval 250 of the vertical blanking interval 242 consists of 11 lines of signal at the normal rate of 15.75 kHz and normal pulse duration of 5 μsecs. In a preferred embodiment of the invention, in the interfering channel search mode, sampling of the baseband LO from subscriber tuning circuits 28 occurs during the subinterval 250. In particular, the sampling occurs during the first line 252 (the tenth line of vertical blanking interval). At the end of twentieth line of the vertical blanking interval 242, the normal video signal begins again with an H SYNC followed by a color subcarrier 220 and video picture information 240.

Figure 12:
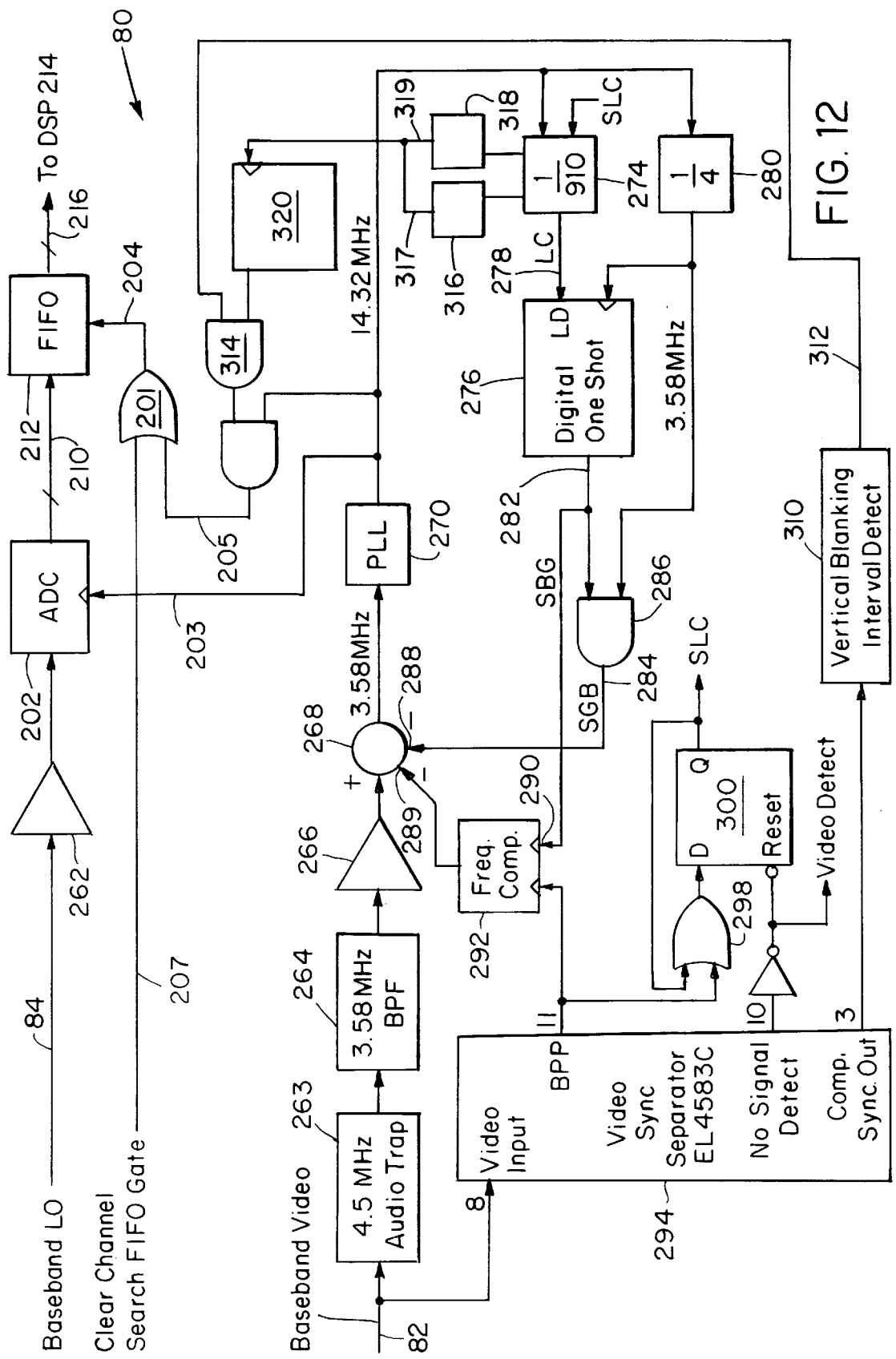
FIG. 12 is a detailed block diagram of a portion of the video signal processor of the invention.

FIG. 12 is a detailed block diagram of the AD/VSP 80 of the invention. The baseband signals on line 84 from the tuning circuit 28 which may contain a LO signal are applied to an amplifier 262 used to set the signals at a level compatible with the input to A/D converter 202. The ADC 202 samples data at a rate set by the signal on sampling clock line 203. Digitized data is forwarded on lines 210 to the FIFO storage device 212. As described below, the sample clocking signal 203 runs constantly at 14.32 MHz such that the ADC 202 is continuously sampling data. However, data is only loaded into the FIFO 212 when the load signal at line 204 is active. As described above, the Clear Channel Search FIFO Gate signal 207 controls the gate signal 204 via OR gate 201 in the clear channel search mode, and the Interfering Channel Search FIFO Gate signal 205 controls the gate signal 204 in the interfering channel search mode. Timing and control circuitry 208 (FIG. 9) as described below is used to control the signal on line 205 such that it becomes active only during the vertical blanking interval of the baseband video signal such that the DSP 214 will only receive LO signal data taken during the quiet period of the baseband video signal in the interfering channel search mode.

To synchronize loading the FIFO 212 with the vertical blanking interval, the baseband video signal is first routed to a 4.5 MHz audio trap 263 to remove the audio from the baseband signals. Next, the output of the audio trap 263 is routed to a 3.58 MHz bandpass filter 264. This filter 264 has a bandwidth of approximately 500 kHz and allows only the 3.58 MHz color subcarrier burst (CSC) signal of the baseband video to pass. The signal is amplified by amplifier 266 such that it is compatible with phase detector 268. The 3.58 MHz signal is then applied to a phase-locked loop (PLL) 270, which generates a signal at its output which has a frequency four times that of the CSC signal, i.e., 14.32 MHz. As mentioned above, this signal is used to clock the ADC 202 on sample clock signal line 203.

The 14.32 MHz signal is also applied to a 12-bit preloadable up counter 274, referred to herein as a line counter, which is preloaded with the number $C73_{HEX}$ or $3,187_D$. The terminal count of the line counter 274 is $2^{12}-1=4,095_D$. By preloading $3,187_D$, the counter divides the input 14.32 MHz clocking frequency by $910_D$ to produce a Line Count (LC) output signal 278 at a frequency of 15.74 kHz, which is approximately the horizontal line rate. The LC signal at line 278 is an active pulse output by the line counter 274 each time the line counter reaches its terminal count. When the Start Line Count (SLC) signal is active, the line counter 274 is activated. That is, the SLC signal is used to gate the line counter 274. When SLC is held low, the counter values are held at the preload value. When SLC becomes high, the count begins such that the LC signal is generated.

The 14.32 MHz signal is also applied to a divide-by-four counter 280 which produces an output signal at the standard 3.58 MHz color burst frequency, which is applied to an input of the digital one-shot 276. The digital one-shot is set to produce an output pulse on line 282, referred to as the Synthesized Burst Gate (SBG) signal, which remains high for 9 cycles of the 3.58 MHZ signal. Thus, a Synthesized Gated Burst (SGB) signal 284 consisting of 9 cycles of 3.58 MHz signal is produced at the output of AND gate 286 by a combination of the 3.58 MHz signal and the SBG signal 282. The SGB signal 284 is applied to a second input 288 of the phase detector 268. The SGB signal is phase locked to the color burst of the input video signal, if present, and gated to occur once per horizontal line during the color burst time.

The baseband video signal is also applied to the video input of a video sync separator (VSS) 294, such as an EL4583C manufactured by Elantec. The VSS 294 receives the baseband video input and generates multiple output signals which facilitate analysis of the input video signal. The back porch pulse (BPP) output is a pulse triggered on the trailing edge of a normal H SYNC pulse of the video and on the rising edge of the serration pulses during the vertical blanking period. The BPP signal is applied to an input of OR gate 298 which drives the D input of a D flip-flop 300. The No Signal Detect signal of the VSS 294 is active when no video signal is present. The D flip-flop 300 is therefore reset when no video input is detected. Therefore, when a video input is present, the Video Detect signal (VD) is high, and the reset signal to the flip-flop 300 is released. When the BPP signal becomes active, the start line count (SLC) signal becomes active, thus allowing line counter 274 to produce the LC signal at the horizontal line rate.

The BPP signal is also applied to a first input of a frequency comparator 292. The BPP signal is compared to the SBG signal applied at a second input, and the frequency difference is applied to a third input 289 of the phase detector 268. The frequency comparator 292 ensures that the SBG signal falls within the BPP signal, since the BPP signal defines the location of the color burst within the baseband video signal. Therefore, the SGB can be locked to the color burst of the actual incoming video signal. When no valid video signal is present, the PLL 270 free runs at 14.32 MHz.

The VSS 294 also generates a Composite Sync Output (CSO) signal on pin 3. The CSO signal replicates all of the video input sync pulses, with a slight propagation delay. The CSO signal is input to vertical blanking interval detection circuitry 310, which contains the sensing and timing logic required to locate the period 252 of the vertical blanking interval (see FIG. 10) and to output an active signal on line 312 during that period 252. The detection circuitry recognizes and waits through the three subintervals 244, 246 and 248 of the vertical blanking interval. It then recognizes the beginning of the subinterval 252 and outputs the active signal. The signal is applied to a first input of an AND gate 314.

Two magnitude comparators 316 and 318 are used to set the start and finish times for the gating signal 205. The magnitude comparators 316 and 318 receive as inputs certain predetermined counting stage outputs from the line counter 274. A particular counting stage is selected for the start time, and a second particular counting stage is selected for the finish time. When the start magnitude comparator 316 indicates that the start time has been reached, the output signal 317 becomes active momentarily to trigger the trigger flip-flop 320 to an active output condition. The output of AND gate 314 becomes active to gate the 14.32 MHz clock signal to the FIFO gating signal 205 and on to the gate signal 204. While the AND gate 314 is active, data on lines 210 from A/D converter 202 is stored in FIFO locations at a 14.32 MHz rate. When the finish time is reached, the magnitude comparator 318 outputs an active pulse on line 319 to trigger flip-flop 320 to toggle its output to the inactive state, thus blocking the 14.32 MHz signal from the FIFO 212. Loading of the FIFO ceases, and an interrupt signal is sent on lines 216 to the DSP 214 to inform the DSP 214 that data is ready for processing.

Figure 13:
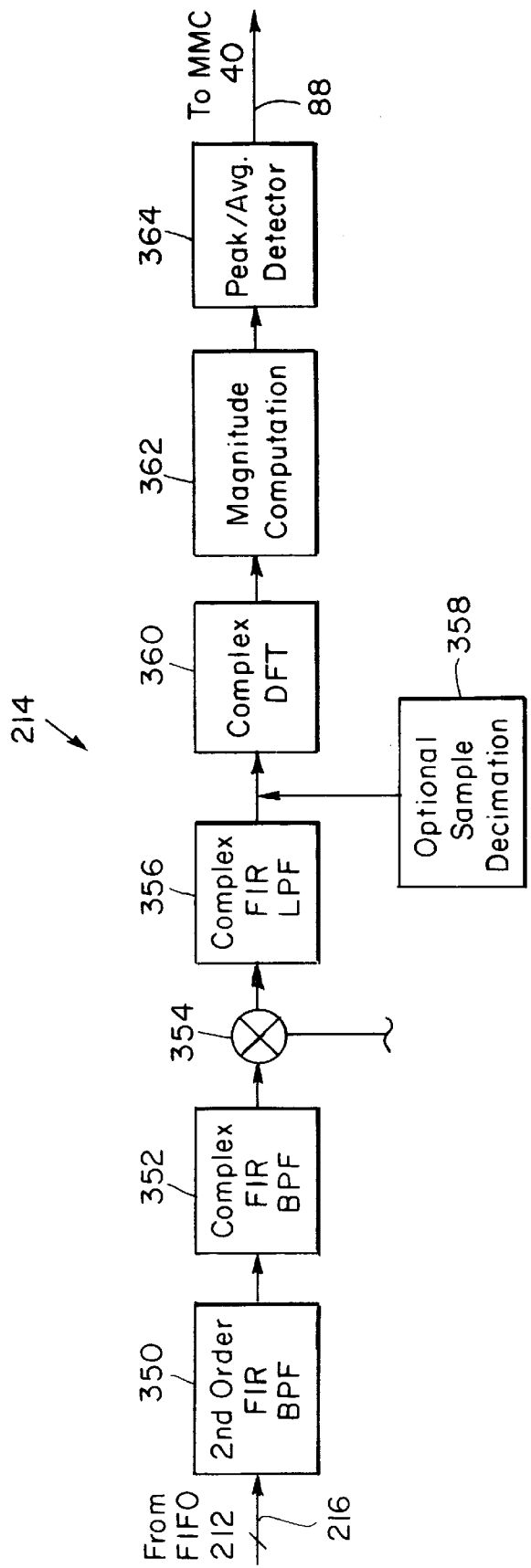
FIG. 13 is a detailed block diagram of the digital signal processor used in the video signal processor of the invention.

FIG. 13 is a block diagram of the DSP 214 of the invention. The DSP 214 can include a commercially available DSP chip such as the Analog Devices 2171 DSP chip. Data from the FIFO 212 is received on lines 216 by a second-order finite impulse response (FIR) bandpass filter 350 having a center frequency of 3.75 MHz. The BPF 350 has zeros at DC and at 7.16 MHz, i.e., one-half the 14.32 MHz sampling rate. The BPF 350 removes DC offsets from the A/D converter and other analog circuits. It also filters high frequency out-of-band components. When the Lo for channels 5 and 6 are being searched for, the center frequency of the filter 350 is 1.75 MHz.

The signal data from filter 350 is applied to a complex FIR bandpass filter 352 which performs additional out-of-band rejection filtering to remove spurious out-of-band signals. The BPF 352 also synthesizes complex signal data from the real signal data received from the BPF 350. The BPF 352 also has a narrow 400 kHz bandwidth. It is known that where an FIR filter narrows the bandwidth of incoming digital data, the dynamic range of the data is increased. In one embodiment, the incoming A/D converter data is 10 bits wide. By narrowing the bandwidth, the complex FIR BPF 352 increases the dynamic range of the data from 10 bits to a higher number of bits, up to the 16-bit single precision limit of the DSP 214.

The BPF 352 is followed by a complex translation stage 354 which shifts the data toward DC. When the 3.75 MHz LO is being searched for, the color subcarrier signal at 3.58 MHz is used to shift the data. Therefore, the band is shifted toward DC such that it is centered at a frequency of 3.75 MHz−3.58 MHz=170 kHz and has a bandwidth of 400 kHz. The shift to DC makes subsequent processing easier than it would be at the former 3.75 MHz center frequency. Also, the sample rate can be decimated down to a much slower rate, if desired.

The complex translation stage 354 is followed by a complex FIR low pass filter 356. The LPF 356 has a break frequency at 370 kHz such that it removes high frequency out-of-band signals beyond the 370 kHz limit of the shifted data. After the data passes through the LPF 356, the sample rate of the data can optionally be decimated down to a much lower sample rate as shown at 358, since the data is now centered at 170 kHz instead of 1.75 or 3.75 MHz. In the present configuration, when L02 (3.75 MHz) is being searched, the sample rate can be divided by a factor of 32. That is, only one data sample for every 32 data samples need be analyzed.

The filtered complex samples are received by the complex Discrete Fourier Transform (DFT) stage 360. In the preferred embodiment, a 1024-point DFT is computed, preferably by a 1024-point Fast Fourier Transform (FFT) algorithm. The complex coefficients from the FFT are forwarded to a magnitude computation stage 362 which converts each of the 1024 complex coefficients into a real magnitude.

The magnitudes are then forwarded to a peak-to-average detector stage 364. The peak/average detector 364 first averages the values of all of the 1024 coefficient magnitudes. Next, it searches for a peak coefficient magnitude. It then computes the ratio of the peak magnitude to the average magnitude and compares that ratio to a predetermined threshold. If the computed ratio exceeds the threshold, then a signal is forwarded over lines 88 to the MMC 40 indicating that it is likely that a LO signal is present in the data from the selected tuning circuit 28. If the computed peak/average ratio is below the threshold, then a signal indicating that no LO signal is present is sent to the MMC 40. In the preferred embodiment, the threshold is presently set to 4.0. Therefore, any peak-to-average ratios which exceed 4.0 indicate a strong likelihood that a LO signal is present.

The peak/average detector 364 also sends two pieces of data to the MMC 40, namely, the peak value and average value computed for the data. The MMC 40 stores these data to accumulate historical information for each channel and each tuning circuit 28. The historical information can be used by the peak/average detector 364 for various tasks. For example, the data may be used to characterize the ambient noise floor for particular channels on particular tuning circuits 28. Based on the individual noise floors, custom peak/average ratio thresholds can be set for each channel in each tuning circuit 28. Another use for the accumulated data is to determine when a particular television tuner 28 has been switched off of a channel it was formerly receiving. When a particular channel is being provided to a tuning circuit 28, the average value of the FFT coefficients will be higher than when no channel is being provided. Therefore, if the average value of a particular set of signal samples suddenly drops, it can be concluded that the channel that was formerly being provided and causing a high average value has been switched off and is no longer being provided to the subscriber.

It has been shown by measurements that in some televisions and VCRs the LO can drift outside the 400 KHz bandwidth window in the absence of a CATV carrier input signal. These televisions depend on the input CATV signal to adjust the center frequency of their tuners via an Automatic Frequency Tuning (AFT) circuit.

The front-end of such a television includes a single conversion receiver with a 45.75 MHz intermediate frequency. The receiver is fine tuned by locking the AFT circuit to the 45.75 MHz IF picture carrier. The AFT depends on hard limiting (approximately 50 dB) of the 45.75 MHz IF picture carrier to remove amplitude variations in the carrier signal. The limited carrier signal is then converted to a DC voltage via a frequency discriminator. The DC signal is then amplified and integrated via an op-amp. The DC voltage at the output of the op-amp is then used to fine tune the televisions local oscillator.

The presence of a limiter makes it possible for the AFT to tune the front-end of a television receiver with an input CATV signal level far below that of a normal (0 dBmV) CATV signal level. This has been proven in the lab by measurements on two televisions and one VCR. The LO of these televisions and VCRs could be pulled (tuned) within the 400 KHz bandwidth window with an input CATV signal level as low as −50 dBmV. This ability of the AFT to fine tune the television in the presence of greatly attenuated input signal level can be utilized by the invention to fine tune the television.

The simplest way to take advantage of the AFT's ability to fine tune the LOs within the 400 KHz bandwidth window with low level signals is to bypass each selection filter system 60 with an attenuated signal path. This has been shown to be effective by laboratory experiment. In the laboratory, the CATV nominal signal level was set to 0 dBmV. With 50 dB of signal attenuation, the LO of the television was brought within the 400 KHz range.

The controller 18 of the invention can also be used to implement a program rating system. Future television standards will require that each individual program be assigned a rating based on its content. In the system of the invention, subscribers can block selected programs on an individual basis based upon their ratings. Subscriber lockout tables can be modified to block access to programs having particular rating values. This "V-chip" rating system can be implemented in at least two ways. First, a command signal can be sent from the headend along the communication link to inform all of the controllers of the ratings of the programs being provided. The MMC 40 receives the rating information, correlates it with each subscriber lockout table, and blocks particular channels accordingly.

Alternatively, the rating information can be provided along with the channel in its video signal. The controller of the invention can also accommodate this approach since the receiver 46 demodulates the television channels from the headend. To implement the rating feature, as each channel is demodulated in sequence, the baseband video is examined for its rating information. The rating is compared to each subscriber lockout table. If, for a given subscriber, a given program has a forbidden rating, then the channel on which the program is being provided will be blocked thereafter for that subscriber until a new program with an acceptable rating is provided on that channel.

The various functions of the television access controller 18 of the invention are controlled by the microprocessor memory and control unit 40. The functions are commanded and controlled by the microprocessor 37 running software stored in memory 39. The microprocessor 37 runs different segments of code depending upon the function being performed. During normal operations, the microprocessor runs its operational code, which includes monitoring code and communications code. The operational code also includes DSP code which is downloaded to the DSP 214 and is used to detect the presence of LO signals, among other functions, as described above.

The monitoring code and communications code both run on the microprocessor and are two separate and independent but cooperating processes. The monitoring code forms the main loop of the operational code, while the communications code runs in the background, giving the monitoring code priority in execution. The monitoring code is responsible for cycling through each channel and each subscriber tuner while LO signals are being detected. The monitoring code also programs the channel selection filters to pass selected channels in accordance with detected LO signals. The monitoring code also detects and records the amount of time particular channels are selected by particular tuning circuits 28. The communications code is used by the MMC 40 to communicate with the cable system headend 12.

The operational code is downloaded from the headend 12 after a system reset in the access controller 18. Therefore, the controller memory 39 also includes a small amount of boot code needed to initialize the controller 18 after a system reset. The boot code consists of code which initializes the microprocessor 37 and the remainder of the controller 18. It also includes system diagnostics code and just enough communications code to allow the downloading of the operational code from the headend 12.

The boot code is only executed following a system reset which normally occurs when power is applied to the controller 18. The first procedure performed by the boot code is initialization of the microprocessor 37. This involves setting up the stack, I/O ports, timers and serial port to match the configuration of the controller 18.

After the microprocessor is initialized, the communications hardware 38 and a real-time clock 43 are initialized. The real-time clock 43 is used to keep track of viewing times for the various channels to enable the microprocessor 37 to generate the viewing table. Next, diagnostics code is run to perform various system diagnostics to ensure that the controller 18 is functioning properly. If the diagnostics are successful, the boot code checks the memory 39 to see if the operational code has been downloaded from the headend 12. If the operational code is present, then the boot code transfers control to it. Otherwise, the system status is set to request that the operational code be downloaded. Once the operational code is downloaded, control is transferred to it. If the diagnostic results are not favorable, control is not transferred to the operational code. Rather, the system status is set to the appropriate diagnostic results code which is polled periodically by the headend 12. Based on the code, appropriate action is taken. If the code indicates a fatal error, control is never transferred to the operational code, and the system will not function. However, if the code indicates a non-fatal error, such as a single bad channel selection filter, the operational code acts as if the failed subsystem was never part of the configuration, and system operation can continue under the impaired condition.

The functions of the monitoring code will now be described with reference to the flowchart shown on FIGS. 14A–14C. The first step 400 of the monitoring code is to initialize the channel selection filters by disabling them such that they do not pass any incoming channels. This can be done by disabling the frequency synthesizers within the filters. Next, the DSP LO detection code is downloaded to the DSP at step 402. Next, the system status is set to a time and date request at step 404, and the controller waits at step 406 to receive the present time and date from the headend 12. When the headend 12 polls the controller 18, the headend 12 will respond to the time and date request by sending to the controller 18 the present time and date. This is done to program the real-time clock 43, and it also informs the headend 12 that the controller 18 has come on line. After the time and date are received, the real-time clock is updated in step 407, and the frequency synthesizers in the receiver 46 and in the channel selection filters are initialized in step 408.

In decision box 410, the memory 39 is checked to determine whether valid viewing history data is present, that is, if any currently valid channel viewing information is still stored in the memory 39. If not, a new viewing table is initialized in steps 412, 414, 416 and 418. In step 412, the viewing date and viewing time are set to the current date and time, respectively. Next, a new viewing table is initialized in step 414. A new channel lock-out table is then initialized in step 416, and finally, DSP data is initialized in step 418.

After the new viewing table is created, or if a valid viewing table was already present in memory, the process proceeds to step 420 in which the process of scanning through individual households at each channel begins. In step 420, the current channel is set to channel 2. In decision step 422, the channel lock-out table is checked to determine if the current channel is enabled for at least one subscriber, that is, that it is not locked out for every subscriber. If the current channel is not enabled for at least one subscriber, then the flow continues to step 424. The current channel is incremented by one and then checked in step 426 to ensure that the last channel, channel 78, has not been reached.

When a current channel is found in decision box 422 which is enabled for at least one subscriber, then the receiver 46 is programmed to receive the LO signal for the current channel in step 428. A current subscriber variable is then set to zero in step 430. Since the controller can service any number of subscribers, the system checks at decision box 431 if the present subscriber exists, i.e., is being serviced. If not, a new subscriber is selected. The current subscriber variable is examined at step 434 to determine whether the last subscriber, subscriber 3, is reached. If so, the current channel is incremented again and the process repeats for the new channel. If the last subscriber is not reached, the current subscriber is incremented in step 436, and the subscriber is checked again at step 431 to determine if the subscriber exists. Once a subscriber is found, a decision is made in step 432 whether the current channel is blocked for the current subscriber. If it is, a new subscriber is checked for the current channel in steps 434, 436, 431 and 432.

Once a serviced subscriber is found for whom the current channel is not blocked, a decision is made at box 438 as to whether the selection filter is available or tuned to the current channel. If no selection filter is available and the selection filter is not tuned to the current channel, then the process returns to select another subscriber. If a selection filter is available or if a selection filter is tuned to the current channel, a decision is made at step 440 as to whether a selection filter is tuned to a channel which is seven channels below the current channel. As described above, if that is the case, then coherent channel interference will appear on the line to the subscriber household. In that case, the interfering channel search for the LO signal described above is implemented at step 442. If no selection filter is tuned to a channel seven channels below the current channel, the clear channel search described above is conducted for the LO signal as indicated by step 444.

What happens next in the monitoring code depends on whether the current channel is presently being viewed, that is, has a selection filter tuned to it. In step 446, a determination is made as to whether a selection filter is tuned to the current channel. If not, in step 448, a determination is made as to whether a selection filter is available to service the current channel. If not, a new subscriber is selected to be searched for the LO signal of the current channel.

If a selection filter is available, a determination is made at step 450 as to whether an LO signal has been detected by the search. If not, once again, the flow returns to a new subscriber. If an LO has been detected, the available selection filter is tuned to the current channel at step 452. Next, a Selection Filter In Use variable is set to true at step 454, a Selection Filter Time variable is set to the current time at step 456, a Selection Filter Channel variable is set to the current channel at step 458, and flow returns to select another subscriber. The variables set in steps 454, 456 and 458 are used to time the use of the current channel by the selection filter to generate viewing data for the viewing table. Thus, if an LO signal is identified for the current channel coming from a subscriber, and that subscriber is not yet receiving the selected channel, a filter is tuned to provide the channel to the subscriber and viewing data for the channel begins being accumulated for the subscriber.

If, on the other hand, a particular selection filter is tuned to the current channel (step 446), that is, the selected channel is already currently being viewed, then the course of action is determined by the presence or absence of a detected LO signal. First, the current time is compared to the Selection Filter Time variable for the tuned selection filter at step 460. If the current time is more than five seconds after the Selection Filter Time, then a five-second channel use interval has been reached, a Channel Counter variable is incremented at step 462, and the Selection Filter Time variable is set to the current time at step 464. At step 466, the Channel Counter variable is checked to determine whether it is approaching one month worth of collected viewing data. If so, the system status is set to Memory Near Full status in step 468. When the headend polls the controller, it will know that viewing data is available and should be requested. At step 470, a determination is made as to whether a LO signal was detected. If not, the selection filter is not needed to provide the channel, and, hence, it is turned off in step 472. In addition, in step 474 the Selection Filter In Use variable is set to false, and flow returns to the next subscriber. If the LO signal was detected, then the selection filter remains in use, and flow once again returns to the next subscriber.

Figure 14A:
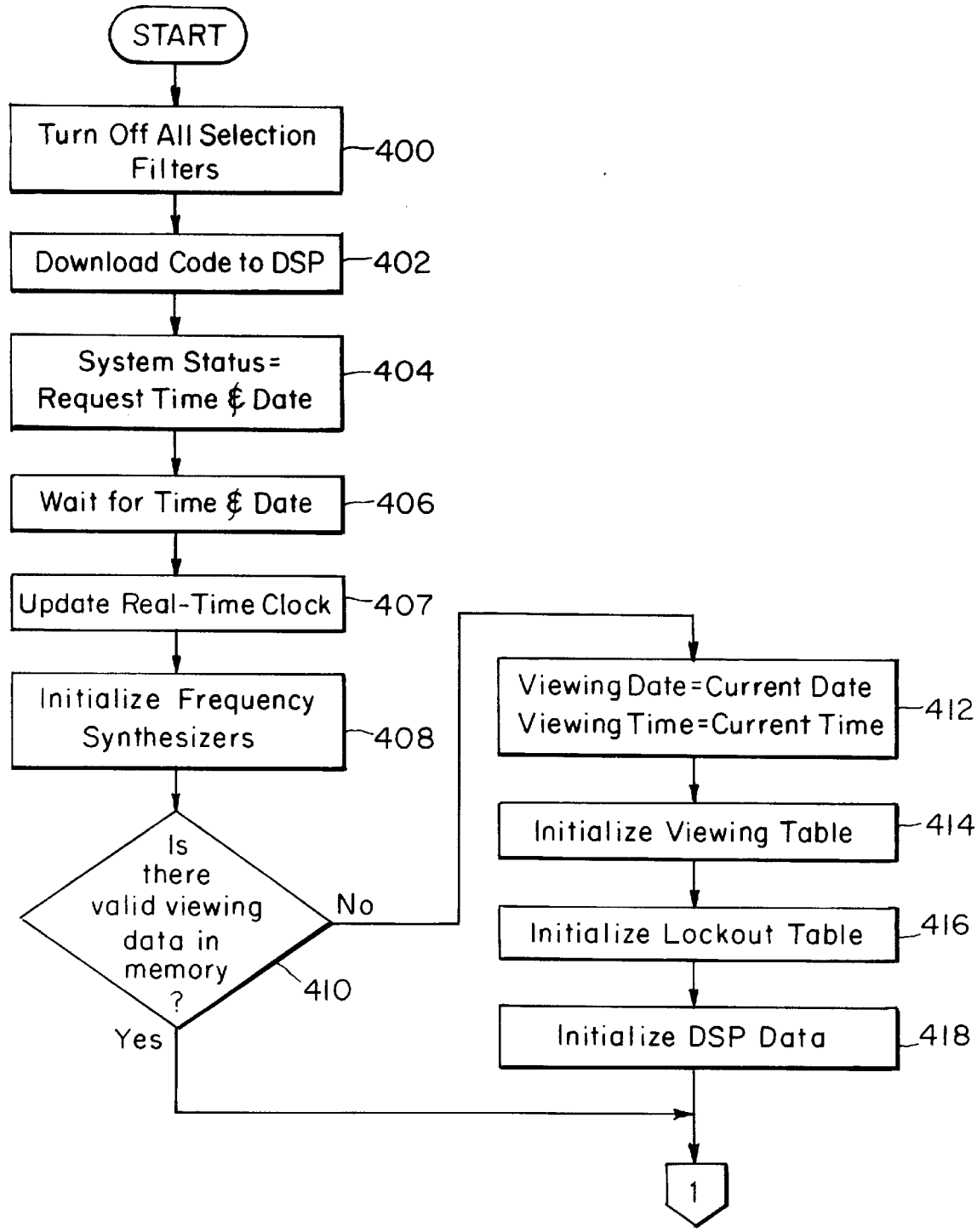
FIGS. 14A–14C contain a flowchart detailing the logical flow of the monitoring code of the invention.
Figure 14B:
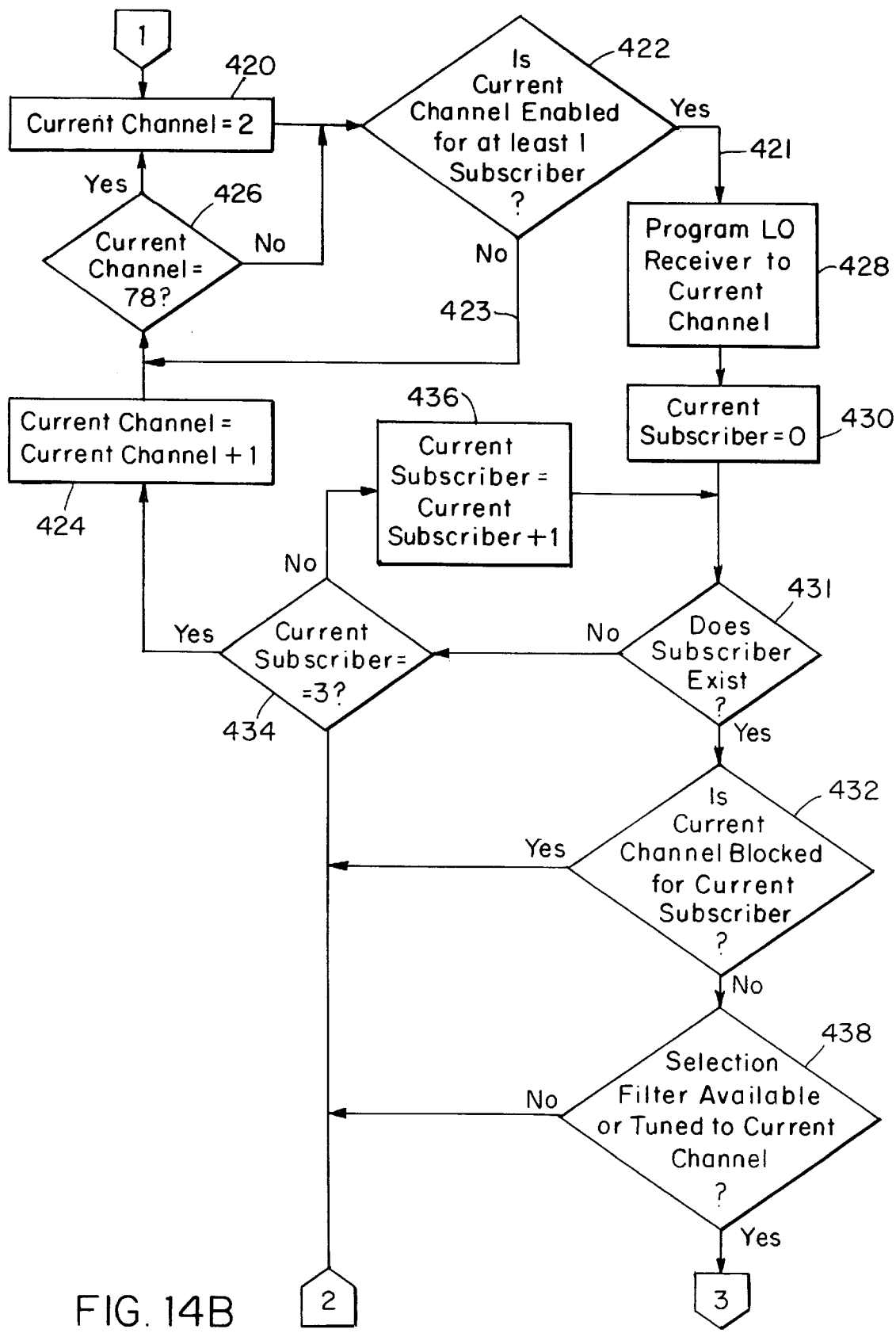
Figure 14C:
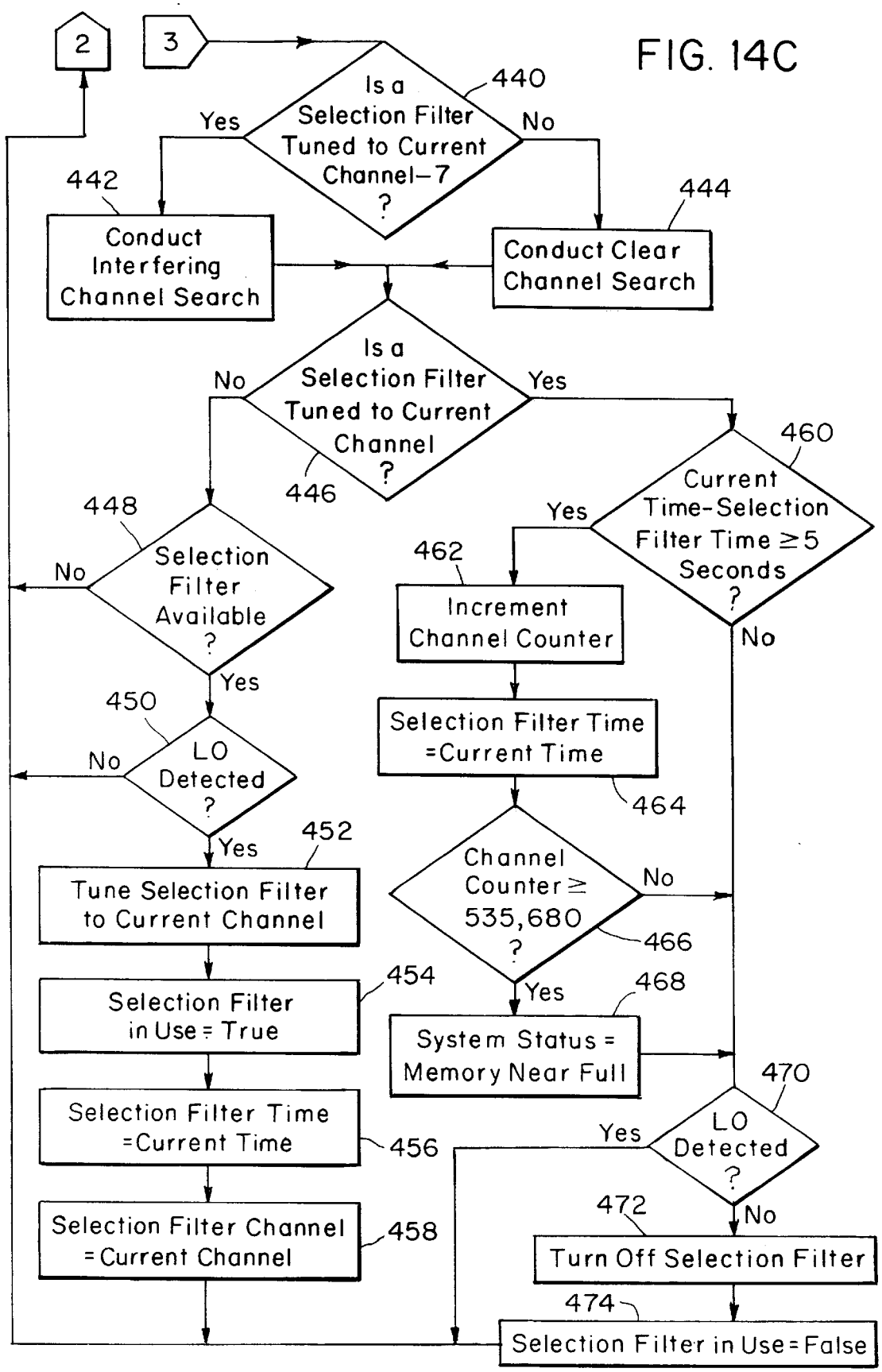

As indicated by the flowchart in FIGS. 14A–14C, to detect selected channels and provide them to subscribers, the controller 18 of the invention looks for one selected channels LO signal at a time in all available subscriber households. It first sets itself to look for one particular local oscillator signal and then cycles through each subscriber to whom service is being provided by the particular controller. After searching each subscriber, it sets the receiver to a new channel, and then checks all subscribers for that channel. When the last channel is reached, it resets itself back to the first channel and repeats the sequence.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. An apparatus for controlling access to cable television channels comprising:

a controller at a cable system node external to a subscriber household for identifying one or more channels to be forwarded to the subscriber; and a tunable filter responsive to the controller for accessing available channels and passing to the subscriber identified channels, the tunable filter comprising a plurality of pass filters, each tunable to pass a single selected channel and comprising:

a bandpass filter having a center frequency which is higher than center frequencies of the available channels, and adapted to sass only a single channel while blocking all other channels;

a first mixer shifting all available television channels in frequency such that only the selected channel passes through the bandpass filter; and a second mixer shifting the selected channel in frequency back to its original frequency.

2. The apparatus of claim 1 wherein the controller receives a signal from the subscriber household to identify a channel selected by the subscriber to be forwarded to the subscriber.

3. The apparatus of claim 2 wherein the signal from the subscriber household is a television local oscillator signal.

4. The apparatus of claim 1 wherein a center frequency of the bandpass filter is in the UHF band.

5. The apparatus of claim 1 wherein each pass filter further comprises a tunable frequency synthesizer providing inputs to the mixers to control amounts of frequency shifting by the mixers.

6. The apparatus of claim 5 wherein the frequency synthesizer is tuned according to a channel selected by the subscriber.

7. The apparatus of claim 5 wherein the controller identifies a channel selected by the subscriber to be forwarded to the subscriber by detecting an encoded signal generated by a signal transmitter in the subscriber household.

8. The apparatus of claim 5 wherein the controller identifies a channel selected by the subscriber to be forwarded to the subscriber by detecting a local oscillator signal from a television tuner.

9. The apparatus of claim 8 wherein the controller performs a Fourier Transform to detect the local oscillator signal.

10. The apparatus of claim 8 wherein the controller synchronizes detection of the local oscillator signal with a video signal of a second channel.

11. The apparatus of claim 10 further comprising a dual receiver for receiving the local oscillator signal and the video signal of the second channel to synchronize detection of the local oscillator signal.

12. The apparatus of claim 10 where in detection of the local oscillator signal is performed during a vertical blanking interval of the video signal of the second channel.

13. The apparatus of claim 10 wherein the controller performs a Fourier Transform to detect the local oscillator signal.

14. The apparatus of claim 1 wherein a channel selected by the subscriber to be forwarded to the subscriber is identified by the controller detecting an encoded signal generated by a signal transmitter in the subscriber household.

15. The apparatus of claim 1 wherein a channel selected by the subscriber to be forwarded to the subscriber is identified by the controller detecting a local oscillator signal from a television tuner.

16. The apparatus of claim 15 wherein the controller synchronizes detection of the local oscillator signal with a video signal of a second channel.

17. The apparatus of claim 16 further comprising a dual receiver for receiving the local oscillator signal and the video signal of the second channel to synchronize detection of the local oscillator signal.

18. The apparatus of claim 16 wherein detection of the local oscillator signal is performed during a vertical blanking interval of the video signal of the second channel.

19. The apparatus of claim 16 wherein the controller performs a Fourier Transform to detect the local oscillator signal.

20. A cable television system comprising:

a headend transmitting available television channels over a cable network;

a plurality of controllers at nodes of the network external to subscriber households identifying selected channels to be forwarded to subscribers, each controller having at least one tunable filter for passing identified channels to a subscribers, the tunable filter comprising a plurality of pass filters, each tunable to pass a single selected channel and comprising:

a bandpass filter having a center frequency which is higher than center frequencies of the available channels, and adapted to pass only a single channel while blocking all other channels;

a first mixer shifting all available television channels in frequency such that only the selected channel passes through the bandpass filter; and a second mixer shifting the selected channel in frequency back to its original frequency.

21. The cable television system of claim 20 wherein the controllers receive signals from subscriber households which identify selected channels to be forwarded to the subscribers.

22. The system of claim 21 wherein the signals from the subscriber households are television local oscillator signals.

23. The system of claim 20 wherein the center frequency of the bandpass filter is in the UHF band.

24. The system of claim 20 wherein each pass filter further comprises a tunable frequency synthesizer providing inputs to the mixers to control amounts of frequency shifting by the mixers.

25. The system of claim 24 wherein the frequency synthesizer is tuned according to a channel selected by the subscriber.

26. The system of claim 24 wherein a controller identifies a channel selected by a subscriber to be forwarded to the subscriber by detecting an encoded signal generated by a signal transmitter in the subscriber household.

27. The system of claim 24 wherein a controller identifies a channel selected by a subscriber to be forwarded to the subscriber by detecting a local oscillator signal from a television tuner.

28. The system of claim 27 wherein the controller performs a Fourier Transform to detect the local oscillator signal.

29. The system of claim 27 wherein the controller synchronizes detection of the local oscillator signal with a video signal of a second channel.

30. The system of claim 29 further comprising a dual receiver for receiving the local oscillator signal and the video signal of the second channel to synchronize detection of the local oscillator signal.

31. The system of claim 29 wherein detection of the local oscillator signal is performed during a vertical blanking interval of the video signal of the second channel.

32. The system of claim 29 wherein the controller performs a Fourier Transform to detect the local oscillator signal.

33. The system of claim 20 wherein a channel selected by a subscriber to be forwarded to the subscriber is identified by a controller detecting an encoded signal generated by a signal transmitter in the subscriber household.

34. The system of claim 20 wherein a channel selected by a subscriber to be forwarded to the subscriber is identified by a controller detecting a local oscillator signal from the subscriber's television tuner.

35. The system of claim 34 wherein the controller synchronizes detection of the local oscillator signal with a video signal of a second channel.

36. The system of claim 35 further comprising a dual receiver for receiving the local oscillator signal and the video signal of the second channel to synchronize detection of the local oscillator signal.

37. The system of claim 35 wherein detection of the local oscillator signal is performed during a vertical blanking interval of the video signal of the second channel.

38. The system of claim 35 wherein the controller performs a Fourier Transform to detect the local oscillator signal.

39. A method of controlling access to cable television channels comprising:

transmitting available television channels over a cable network to cable network nodes external to subscriber households;

identifying selected channels to be forwarded to subscribers; and at the nodes, filtering the available channels to pass the selected channels to the subscribers, by shifting the available channels to higher frequencies, passing the selected channels through tunable bandpass filters and shifting the selected channels back to their original frequencies.

40. The method of claim 39 wherein identifying selected channels comprises detecting signals from subscriber households which identify selected channels to be forwarded to the subscribers.

41. The method of claim 40 wherein the signals detected from subscriber households are television local oscillator signals.

42. The method of claim 39 wherein the available channels are shifted into the UHF band.

43. The method of claim 39 wherein the identifying step comprises detecting an encoded signal generated by a signal transmitter in a subscriber household.

44. The method of claim 39 wherein the identifying step comprises detecting a local oscillator signal from a television tuner in a subscriber household.

45. The method of claim 44 further comprising computing a Fourier Transform to detect the local oscillator signal.

46. The method of claim 44 further comprising synchronizing detection of the local oscillator signal with a video signal of a second channel.

47. The method of claim 46 wherein the local oscillator signal is detected during a vertical blanking interval of the second signal.

48. The method of claim 46 further comprising computing a Fourier Transform to detect the local oscillator signal.

49. The method of claim 39 wherein the step of identifying channels comprises detecting an encoded signal generated by a signal transmitter in a subscriber household.

50. The method of claim 39 wherein the step of identifying channels comprises detecting a local oscillator signal from a television tuner in a subscriber household.

51. The method of claim 50 further comprising synchronizing detection of the local oscillator signal with a video signal of a second channel.

52. The method of claim 51 wherein the local oscillator signal is detected during a vertical blanking interval of the second signal.

53. The method of claim 51 further comprising computing Fourier Transform to detect the local oscillator signal.

* * * * *